(12) United States Patent
Naito

(10) Patent No.: US 8,290,255 B2
(45) Date of Patent: Oct. 16, 2012

(54) IMAGE PROCESSING METHOD, IMAGE PROCESSING APPARATUS, AND PROGRAM

(75) Inventor: Satoshi Naito, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 378 days.

(21) Appl. No.: 12/697,438

(22) Filed: Feb. 1, 2010

(65) Prior Publication Data

US 2010/0202685 A1    Aug. 12, 2010

(30) Foreign Application Priority Data

Feb. 6, 2009   (JP) .................................. 2009-026689
Feb. 6, 2009   (JP) .................................. 2009-026690

(51) Int. Cl.
*G06K 9/00* (2006.01)

(52) U.S. Cl. ...................................................... 382/164

(58) Field of Classification Search .................. 382/164, 382/165, 225
See application file for complete search history.

(56) References Cited

U.S. PATENT DOCUMENTS

| 5,680,478 | A | * | 10/1997 | Wang et al. .................. 382/176 |
| 6,701,010 | B1 |   | 3/2004  | Katsuyama |
| 7,542,173 | B2 | * | 6/2009  | Suzuki ......................... 358/3.27 |
| 7,623,712 | B2 |   | 11/2009 | Dai et al. |
| 7,630,544 | B1 | * | 12/2009 | Zhou ............................ 382/164 |
| 7,813,546 | B2 | * | 10/2010 | Yamazaki .................... 382/167 |
| 8,149,465 | B2 | * | 4/2012  | Maki ........................... 358/3.27 |

FOREIGN PATENT DOCUMENTS

| JP | 11-288465 | 10/1999 |
| JP | 2007-158725 | 6/2007 |
| JP | 2008-42345 | 2/2008 |

* cited by examiner

*Primary Examiner* — Samir Ahmed
(74) *Attorney, Agent, or Firm* — Fitzpatrick, Cella, Harper & Scinto

(57) ABSTRACT

A clustering unit first calculates a distance between a feature vector of a processing object pixel and a representative feature vector of a cluster to which a pixel with a high probability of belonging to the same cluster as the processing object pixel such as a nearby pixel of the processing object pixel belongs. When the calculated distance is less than or equal to a first threshold, the processing object pixel is allocated to a cluster to which the nearby pixel or a background image belongs.

24 Claims, 20 Drawing Sheets

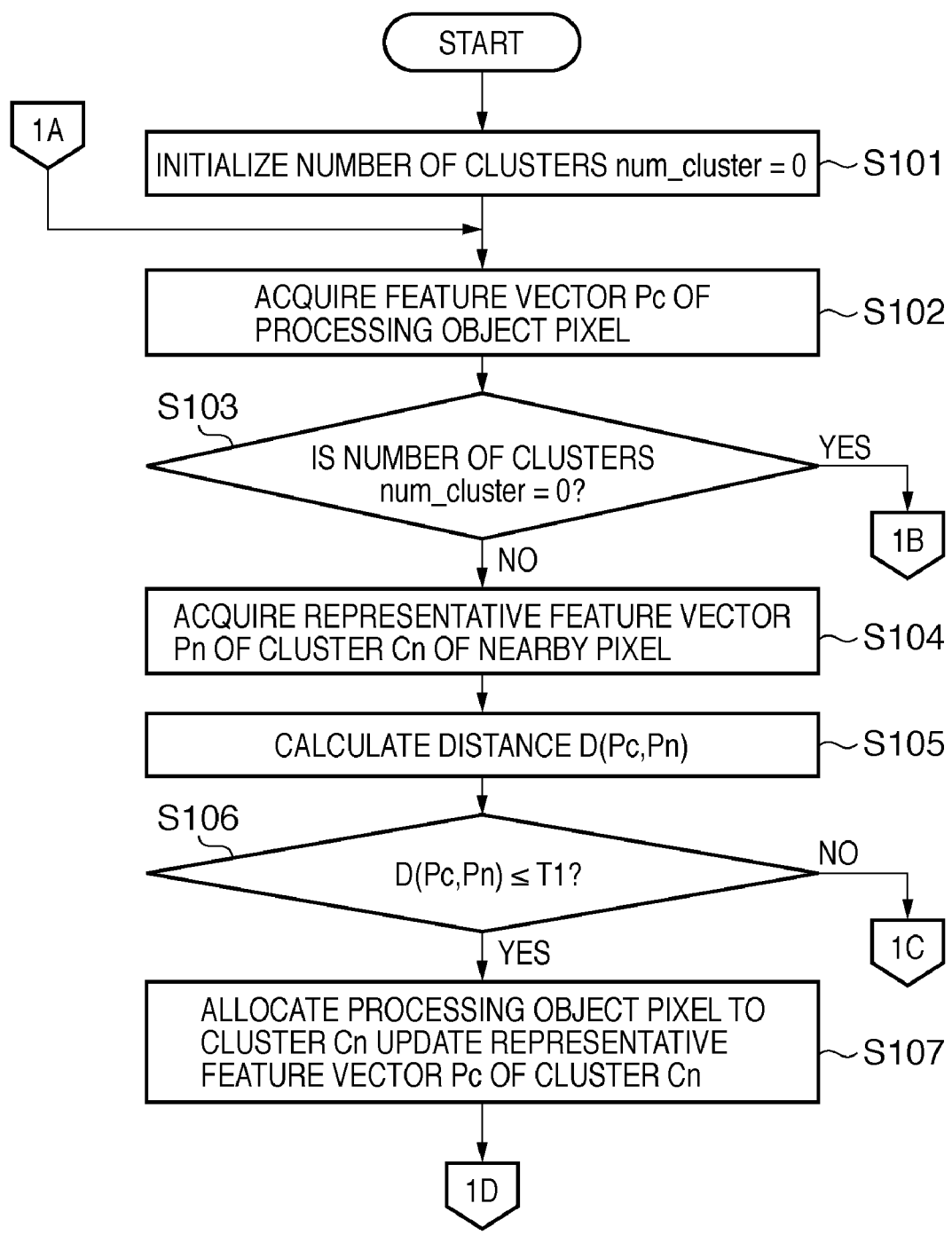
F I G. 1A

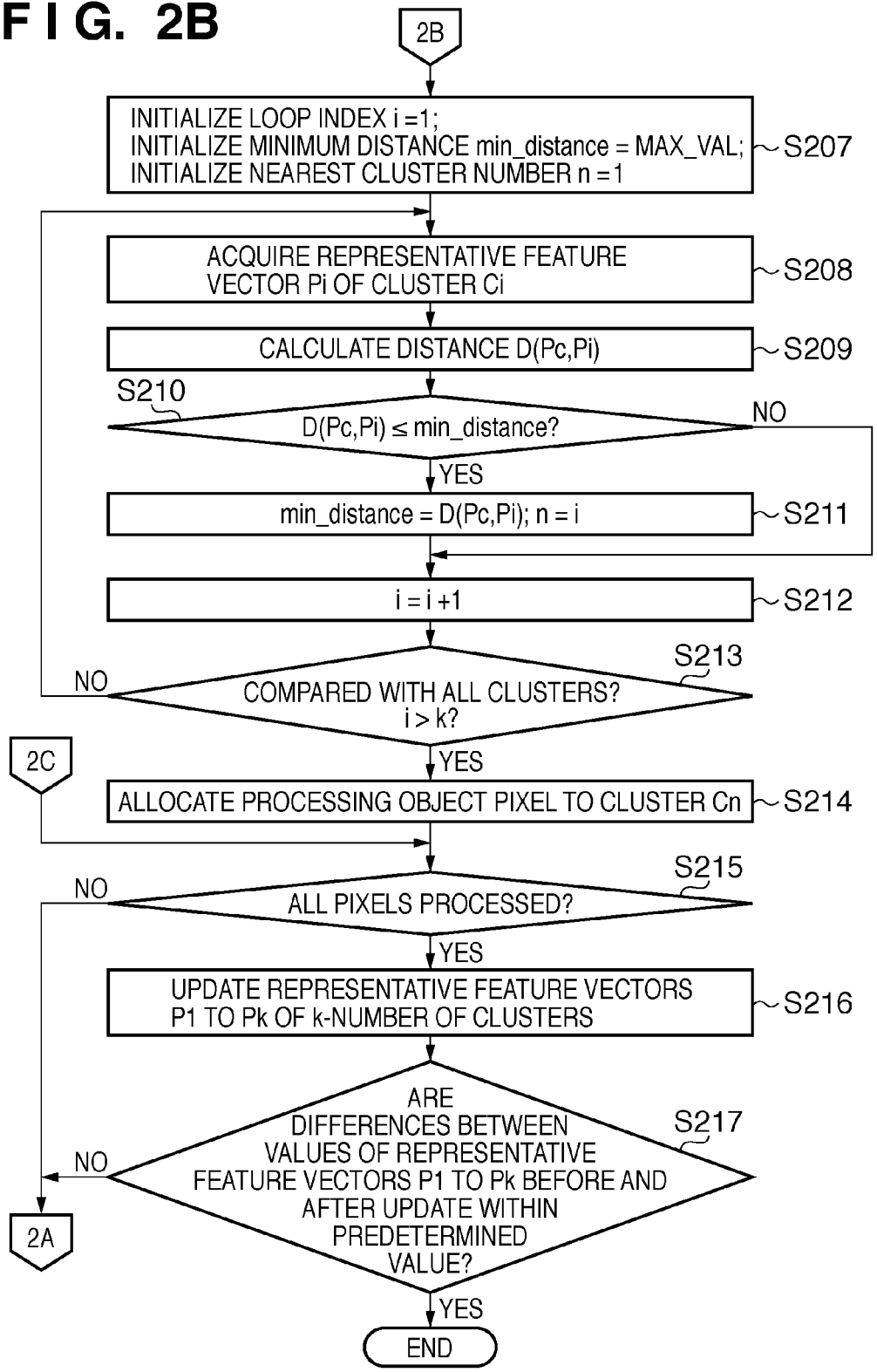

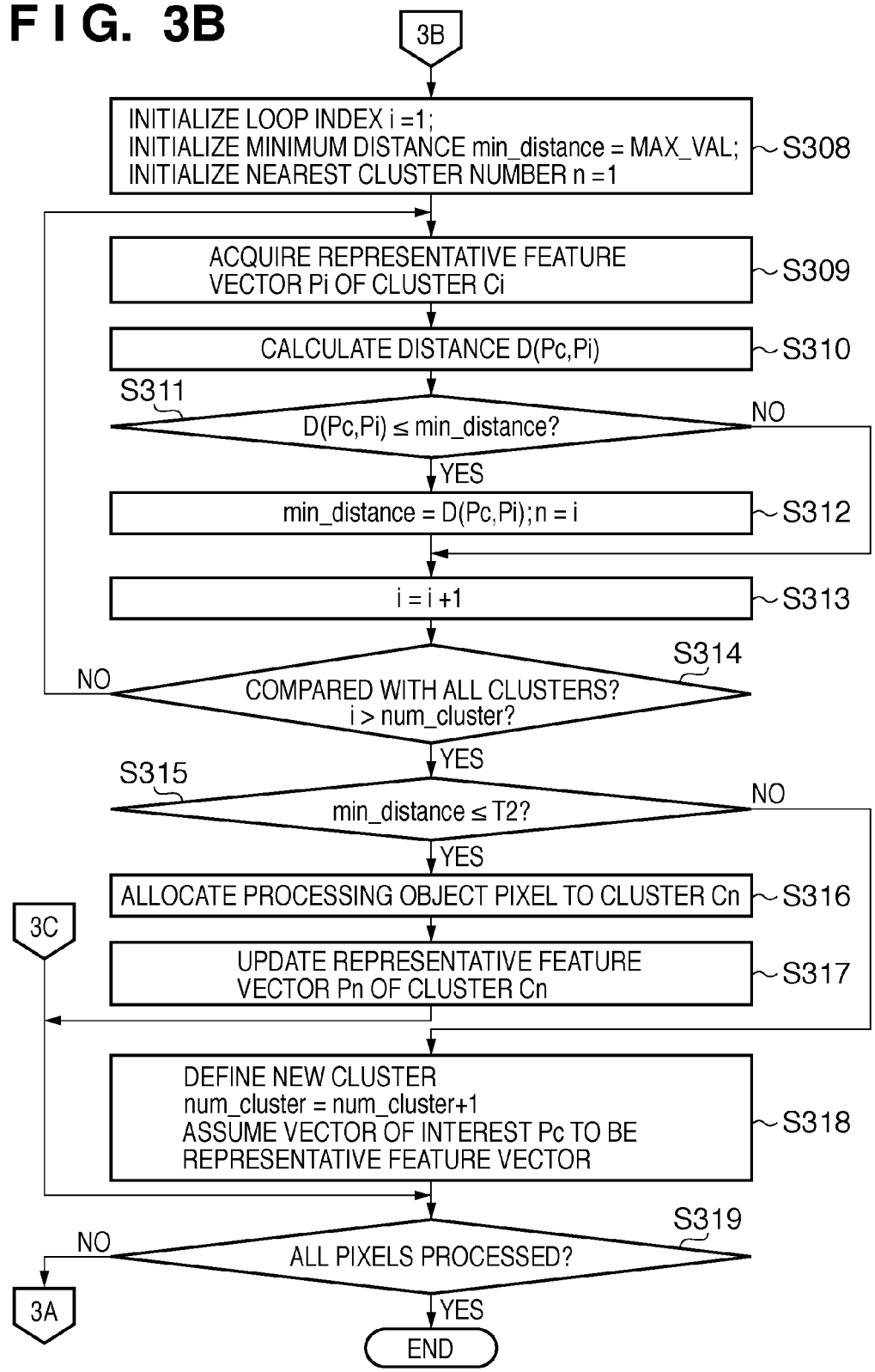

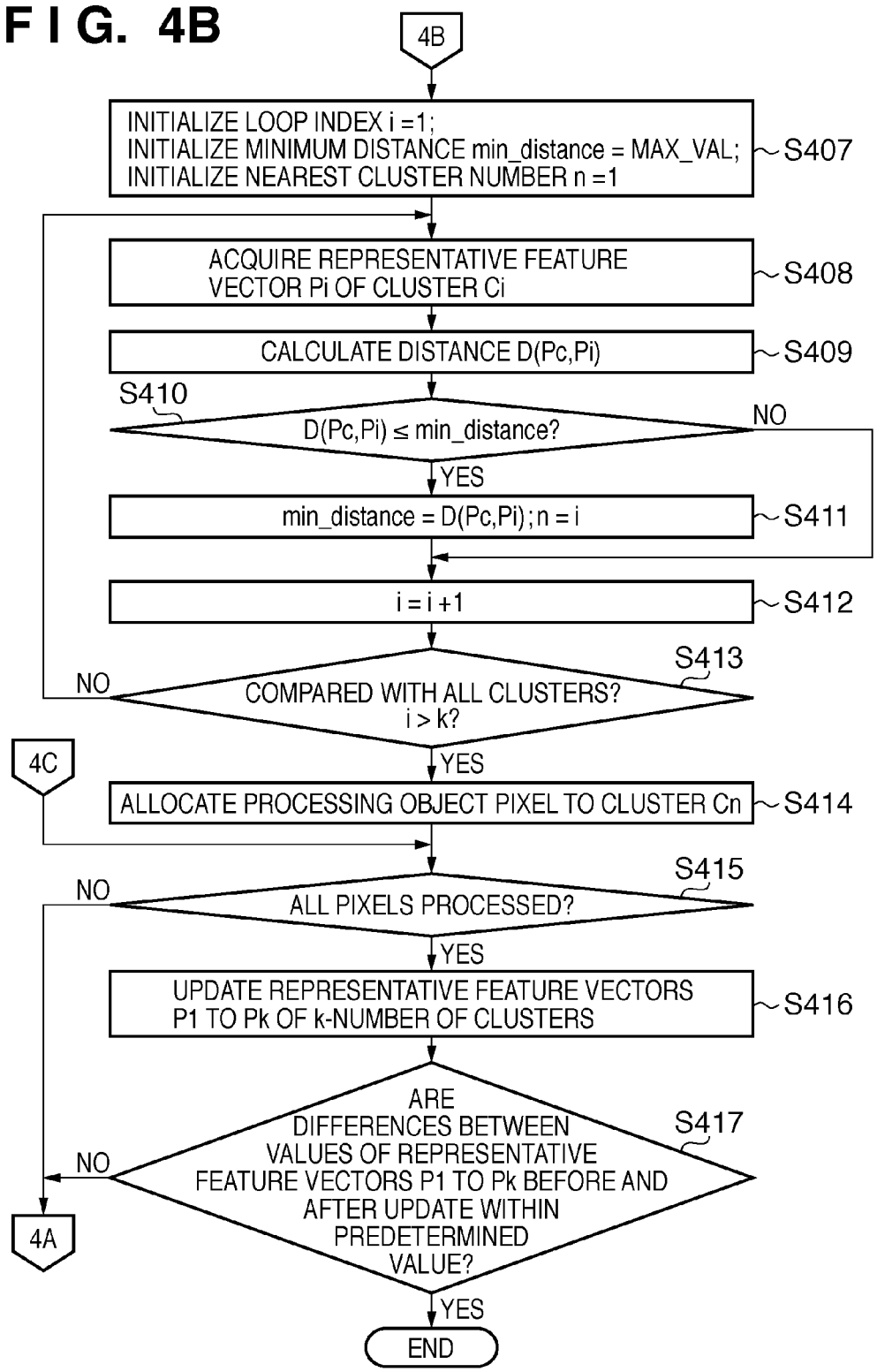

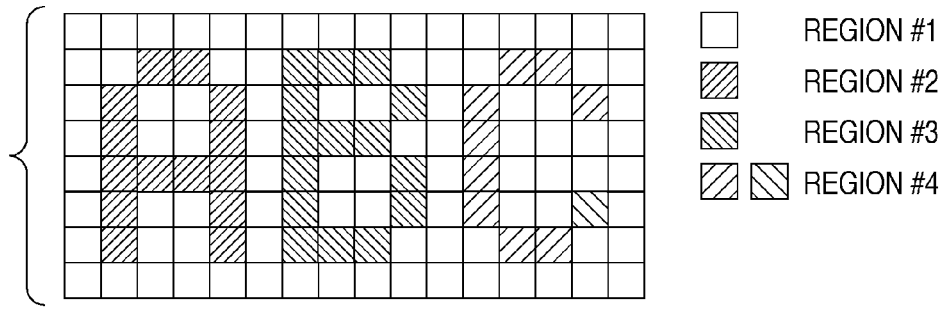

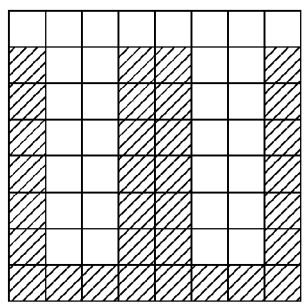
FIG. 10A
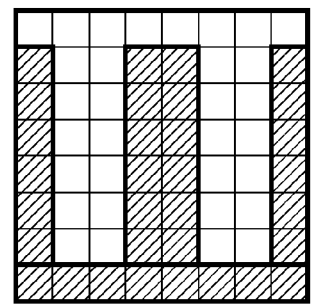
FIG. 10B
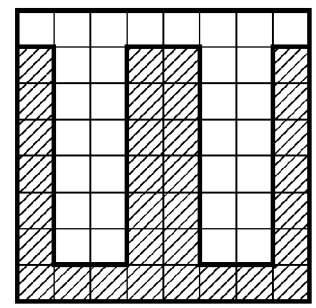
FIG. 10C
FIG. 11A
FIG. 11B
FIG. 11C
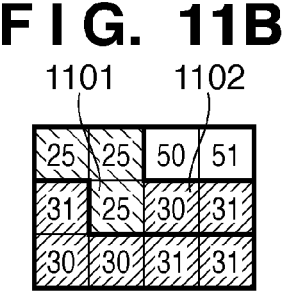

IMAGE PROCESSING METHOD, IMAGE PROCESSING APPARATUS, AND PROGRAM

BACKGROUND OF THE INVENTION

1. Field of the Invention

The present invention relates to an image processing method, an image processing apparatus, and a program for performing region splitting on image data.

2. Description of the Related Art

In recent years, there has been a growing demand for saving or sending documents in computerized forms instead of in paper form. The term "computerization of a document," as used herein, is not simply limited to reading a paper document by a scanner and the like to obtain image data. For example, image data is separated into regions of different properties such as characters, diagrams, photographs, and tables which make up a document. Accordingly, a computerization process of a document involves converting a region into data of an optimal format, such as a character region into character codes, a diagram region into vector data, a background region or a photograph region into bitmap data, and a table region into structural data.

As an example of a method of conversion to vector data, Japanese Patent Laid-Open No. 2007-158725 discloses an image processing apparatus. With the disclosed image processing apparatus, region splitting is performed by clustering, contours of respective regions are extracted, and the extracted contours are converted into vector data. In addition, Japanese Patent Laid-Open No. 2008-042345 discloses an image processing method involving separating an image into a background and a foreground, and converting the foreground into vector data while performing data compression on the background using a background-specific method.

Known methods of splitting an image into regions by clustering include a nearest neighbor clustering method and a K-means clustering method.

The nearest neighbor clustering method involves comparing a feature vector of a processing object pixel with representative feature vectors of respective clusters to find a cluster having a feature vector whose distance is minimum. If the distance is less than or equal to a predetermined threshold, the processing object pixel is allocated to the corresponding cluster. If not, a new cluster is defined and the processing object pixel is allocated to the new cluster. Color information (pixel values comprising R, G, and B) is generally used as feature vectors. A center of a cluster (i.e., mean vector of vectors in the cluster) is generally used as a representative feature vector of the cluster. In other words, a representative feature vector of a cluster is a mean value of feature vectors (color information) of the respective pixels allocated to the cluster.

The K-means clustering method involves defining, in advance, K-number of clusters and representative feature vectors thereof, and allocating each pixel to a cluster whose distance from a feature vector is minimum. After processing on all pixels is completed, the representative feature vector of each cluster is updated. The above processing is repeated until the differences in representative feature vectors before and after update equals or falls below a predetermined value.

Both the nearest neighbor clustering method and the K-means clustering method involve a process for finding a cluster having a representative feature vector whose distance from a feature vector of a processing object pixel is minimum from among all clusters. In other words, distances from the representative feature vectors of all clusters must be calculated for each pixel. Consequently, calculation time problematically increases when the number of clusters is increased in order to improve region splitting accuracy.

As a conventional technique for solving the problem described above, for example, Japanese Patent Laid-Open No. 11-288465 discloses a color image processing apparatus. With the conventional technique, clustering is performed based on feature vectors (color information) of a processing object pixel and an adjacent pixel. Subsequently, clusters are grouped based on color information and geometry information of the clusters. In this case, geometry information refers to coordinate information representing proximity between regions, and the like.

However, since the conventional techniques require that a cluster be newly defined and a pixel of interest be allocated to the newly-defined cluster when the distance between feature vectors of a processing object pixel and an adjacent pixel is large, a large number of clusters ends up being defined. Consequently, the processing time required by grouping problematically increases.

SUMMARY OF THE INVENTION

In consideration thereof, the present invention provides an image processing method that enables image region splitting by clustering to be performed at high speed.

In order to solve the problems described above, an image processing method according to the present invention involves splitting image data into a plurality of clusters, the image processing method including: a first distance calculating step of calculating a first distance that is the distance between a feature vector of a processing object pixel and a representative feature vector of a cluster to which a nearby pixel of the processing object pixel belongs; a first allocating step of allocating the processing object pixel to the cluster to which the nearby pixel belongs when the first distance is less than or equal to a first threshold; a second distance calculating step of respectively calculating, when there are defined clusters and the first distance is greater than the first threshold, distances between the feature vector of the processing object pixel and representative feature vectors of the respective defined clusters, and calculating a second distance that is a minimum distance among the respective calculated distances; and a second allocating step of allocating the processing object pixel to a cluster corresponding to the second distance when the second distance is less than or equal to the second threshold, and newly defining a cluster to which the processing object pixel is to be allocated when there are no defined clusters or when the second distance is greater than the second threshold and allocating the processing object pixel to the newly defined cluster.

Another aspect of the present invention is an image processing method of splitting image data into a plurality of clusters for which representative feature vectors have been defined in advance, the image processing method including: a first distance calculating step of calculating a first distance that is the distance between a feature vector of a processing object pixel and a representative feature vector of a cluster to which a nearby pixel of the processing object pixel belongs; a first allocating step of allocating the processing object pixel to the cluster to which the nearby pixel belongs when the first distance is less than or equal to a threshold; and a second allocating step of calculating distances between the feature vector of the processing object pixel and respective representative feature vectors of the plurality of clusters when the first distance is greater than the threshold, and allocating the processing object pixel to a cluster having a minimum distance.

An image processing method according to the present invention first calculates a distance between a feature vector of a processing object pixel and a representative feature vector of a cluster conceivably having a high probability of the processing object pixel belonging thereto such as a cluster to which an adjacent pixel belongs. When the distance is less than or equal to a threshold, region splitting is performed on the assumption that the processing object pixel belongs to the aforementioned cluster. Consequently, region splitting can now be performed at high speed by reducing the number of distance calculations as compared to conventional methods.

Further features of the present invention will become apparent from the following description of exemplary embodiments with reference to the attached drawings.

BRIEF DESCRIPTION OF THE DRAWINGS

FIG. 1A and FIG. 1B are flowcharts illustrating specific processes of an image processing method according to a first embodiment;

FIG. 2A and FIG. 2B are flowcharts illustrating specific processes of an image processing method according to a second embodiment;

FIG. 3A and FIG. 3B are flowcharts illustrating specific processes of an image processing method according to a third embodiment;

FIG. 4A and FIG. 4B are flowcharts illustrating specific processes of an image processing method according to a fourth embodiment;

FIG. 9A, FIG. 9B, FIG. 9C, and FIG. 9D are diagrams illustrating the number of distance calculations in the image processing method according to the first embodiment;

FIG. 10A, FIG. 10B, and FIG. 10C are diagrams illustrating region splitting in conventional art and in the image processing method according to the first embodiment;

FIG. 11A, FIG. 11B, and FIG. 11C are diagrams illustrating region splitting in the image processing method according to the first embodiment;

DESCRIPTION OF THE EMBODIMENTS

<First Embodiment>

An image processing method according to a first embodiment of the present invention and a configuration of a vector data converting apparatus using the image processing method will now be described with reference to FIG. 7. Clusters to which pixels belong are retained in a memory or the like as, for example, bitmap data having attributes associated with the respective pixels. Therefore, "a pixel allocated to a cluster" means that identification information of the cluster is written or saved as information indicating the cluster to which the pixel is allocated among attributes associated to the pixel.

Figure 7:
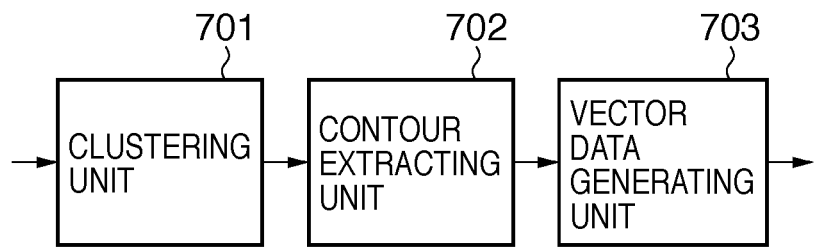
FIG. 7 is a block diagram illustrating a configuration of a vector data converting apparatus.

In FIG. 7, reference numeral 701 denotes a clustering unit that applies the image processing method according to the present embodiment to perform region splitting on an image. Image data is inputted per pixel to the clustering unit 701 in a raster scan order starting from a top left pixel. Reference numeral 702 denotes a contour extracting unit that extracts a contour of each region split by the clustering unit 701. Reference numeral 703 denotes a vector data generating unit that generates vector data based on the contour extracted by the contour extracting unit 702. The configuration illustrated in FIG. 7 represents a software module realized when, for example, a program is executed by a computer. The computer may be a general-purpose computer or an embedded computer built into a digital multifunctional machine or the like. The configuration of the computer system is a basic configuration that includes a processor, a main memory, a file storage, a user interface, and an interface between the computer system and an external device (e.g., scanner). Image data of a processing object according to the present embodiment is image data stored in a file storage or, for example, image data read by a scanner or received from another computer connected by communication.

Figure 1B:
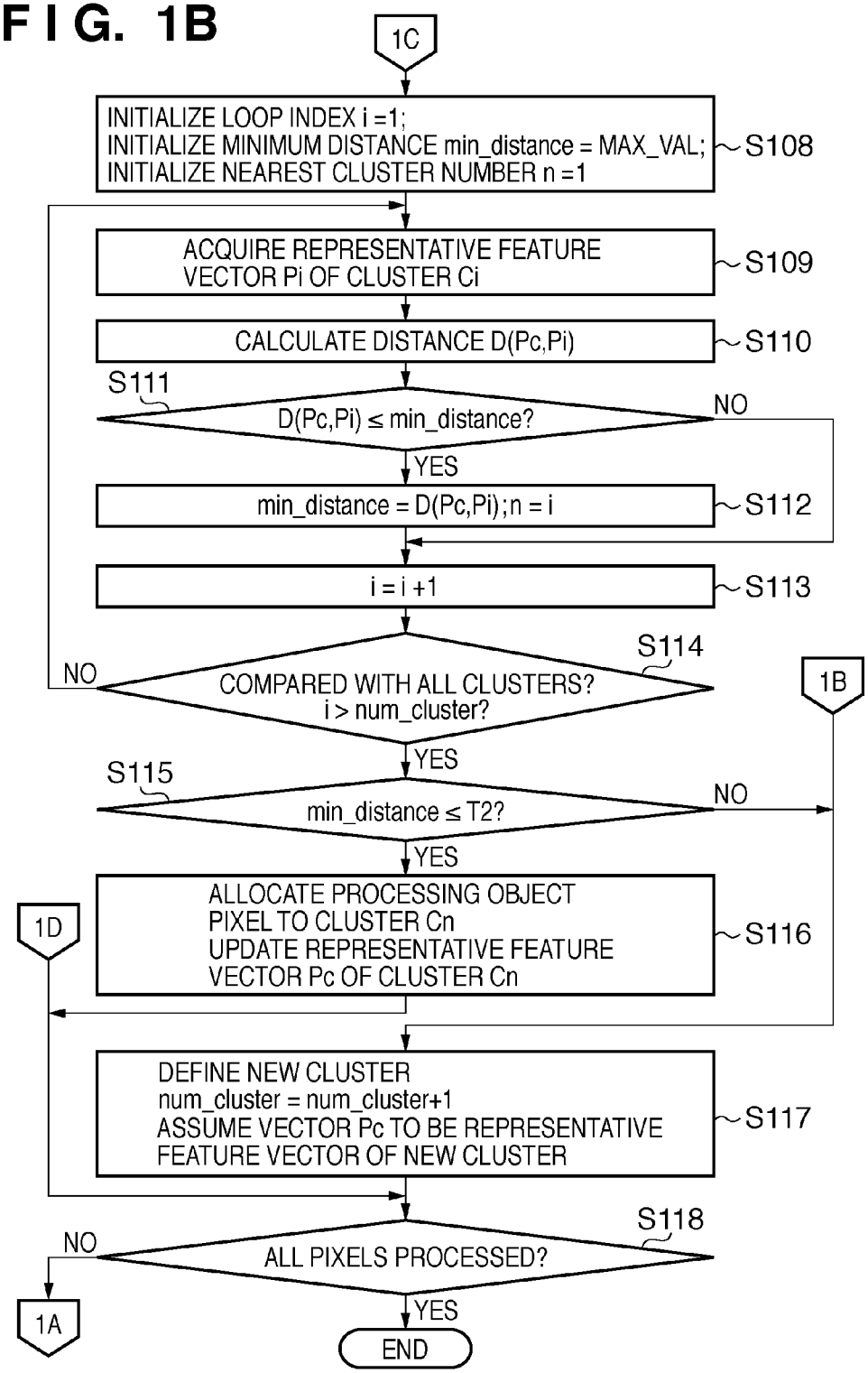

Operations of the clustering unit 701 will now be described in detail with reference to the flowcharts illustrated in FIGS. 1A and 1B.

A variable num_cluster representing the number of clusters is initialized to 0 (step S101). A feature vector Pc of a pixel that is a clustering object (hereinafter referred to as a "processing object pixel") is acquired (step S102). While a pixel value in an RGB color space (i.e., color value) is to be used as a feature vector in the image processing method according to the present embodiment, the present invention is not limited thereto. For example, a pixel value in a YCC color space may be used as a feature vector, or coordinate information of a pixel may be used as a feature vector in addition to a pixel value.

A judgment is made on whether or not the number of clusters is 0 (step S103). If the number of clusters is 0 (YES in step S103), processing proceeds to step S117. If not (NO in step S103), processing proceeds to step S104.

In step S104, a representative feature vector Pn of a cluster Cn to which is allocated a pixel (hereinafter referred to as a "nearby pixel") located in the vicinity of the processing object pixel is acquired. In this case, a representative feature vector is assumed to be a mean value of feature vectors of pixels allocated to a cluster. In other words, a representative feature vector of a cluster is assumed to be a mean value of pixel values of pixels allocated to the cluster.

While a pixel adjacent to the left of a processing object pixel is used as a nearby pixel in the image processing method according to the present embodiment, the present invention is not limited thereto. For example, a plurality of pixels located to the left, above and above-left of a processing object pixel may be considered as being nearby pixels. The number of pixels to be referenced as nearby pixels can be decided according to, for example, the capacity of a memory capable of storing nearby pixel information. Since pixels included in an image characteristically have high spatial correlations, it is highly probable that a pixel and a nearby pixel belong to the same cluster (for example, both pixels having similar colors). Therefore, in the present embodiment (as well as in the third and fifth embodiments), nearby pixels are used as pixels with a high probability of belonging to the same cluster.

In step S105, a distance D (Pc, Pn) between the feature vector Pc of the processing object pixel and a representative feature vector Pn of a nearby pixel is calculated. The distance D (Pc, Pn) calculated at this point will also be referred to as a first distance. The same applies to the other embodiments. While a Euclidean distance is to be calculated in the image processing method according to the present embodiment, the present invention is not limited thereto and, for example, a Manhattan distance can be calculated instead.

The distance D (Pc, Pn) is compared with a predetermined first threshold T1. If the distance D (Pc, Pn) is less than or equal to the threshold T1 (i.e., less than or equal to the first threshold) (YES in step S106), the processing object pixel is allocated to the cluster Cn and the representative feature vector of the cluster Cn is updated (step S107). If not (NO in step S106), processing proceeds to step S108. The allocation process is, for example, a process of defining an allocation destination cluster of a pixel by writing identification information unique to the cluster Cn as cluster information indicating a cluster that is the allocation destination included in the attributes of the processing object pixel. In order to distinguish this allocating step from other allocating steps, the allocating step will also be referred to as a first allocating step. In addition, updating refers to recalculating a mean value of feature vectors of pixels belonging to the cluster including object pixels newly determined to be allocated.

In the image processing method according to the present embodiment, while the value of the threshold T1 is assumed to be smaller than that of threshold T2 to be described later, the present invention is not limited thereto and the same value may be used instead.

When acquiring representative feature vectors of the respective clusters to which the plurality of nearby pixels are allocated in step S104, distances to the respective representative feature vectors are to be calculated to select a minimum value thereof and compare the same with the threshold T1. Alternatively, calculations of distances to the representative feature vectors of clusters to which the nearby pixels are allocated and comparisons with the threshold T1 may be sequentially preformed in an order of, for example, left, above, above left, and the like. In this case, an allocation destination cluster is to be determined upon judging that a representative feature vector is less than or equal to the threshold T1, whereby calculations on the distances to representative feature vectors of clusters to which the remaining nearby pixels are allocated are to be terminated.

When processing proceeds to step S108 (NO in step S106), there is a large distance between the feature vector of the processing object pixel and the representative feature vector of a cluster to which a nearby pixel is allocated. Therefore, comparisons with the representative feature vectors of all clusters are to be performed in steps S108 to S114.

In step S108, a loop index i is initialized (initial value=1). In addition, a variable min_distance representing a minimum distance among the distances between the feature vector of the processing object pixel and the representative feature vectors of the respective clusters is initialized by a constant MAX_VAL. In this case, a value greater than the maximum possible distance in a feature space (color information) is set as the constant MAX_VAL. Furthermore, a variable n representing a cluster number of a cluster having a minimum distance to the feature vector of the processing object pixel is initialized (initial value=1).

A representative feature vector Pi of a cluster Ci is acquired (step S109). A distance D (Pc, Pi) between the feature vector Pc of the processing object pixel and the representative feature vector Pi of the cluster Ci is calculated (step S110) and compared with the variable min_distance (step S111). When the distance D (Pc, Pi) is less than or equal to the variable min_distance (YES in step S111), the distance D (Pc, Pi) is substituted into min_distance and the loop index i is substituted into the variable n (step S112), and processing proceeds to step S113. If not (NO in step S111), processing proceeds to step S113.

In step S113, 1 is added to the loop index i. In step S114, a judgment is made on whether or not comparisons between the feature vector Pc of the processing object pixel and the representative feature vectors of all clusters have been completed. If comparisons with all clusters have been completed (YES in step S114), processing proceeds to step S115. If not (NO in step S114), processing proceeds to step S109.

In step S115, the variable min_distance is compared with the second threshold T2. In this case, a minimum value is stored in the variable min_distance, whereby a distance represented by the variable min_distance will also be referred to as a second distance. The same applies to the other embodiments. When the variable min_distance is less than or equal to the threshold T2 (i.e., less than or equal to the second threshold) (YES in step S115), the processing object pixel is allocated to the cluster Cn and the representative feature vector Pn of the cluster Cn is updated. In other words, in this case, the processing object pixel is allocated to a cluster corresponding to the second distance. In order to distinguish the allocating step from other allocating steps, the allocating step may also be referred to as a second allocating step. When the variable min_distance is greater than the threshold T2 (NO in step S115), the distances between the clusters and the feature vector of the processing object pixel are all large. Therefore, a new cluster is defined and the processing object pixel is allocated to the new cluster (step S117). Defining a new cluster means, for example, determining unique identification information indicating a new cluster. In step S117, the feature vector Pc of the processing object pixel is assumed to be the representative feature vector of the cluster. In addition, 1 is added to the number of clusters num_cluster.

When all pixels in the image data are processed (YES in step S118), processing of the clustering unit 701 is concluded. If not (NO in step S118), processing returns to step S102 and sets a subsequent pixel as a processing object.

As described above, the image processing method according to the present embodiment first compares a feature vector of a processing object pixel with representative feature vectors of clusters to which nearby pixels are allocated (steps S104 to S106). Generally, since image data has a high correlation between adjacent pixels, it is highly probable that the processing object pixel is allocated to the same cluster as a nearby pixel. Therefore, the number of calculations of distances (hereinafter, referred to as "distance calculations") between a feature vector of a processing object pixel and representative feature vectors of clusters can be reduced in comparison with a conventional nearest neighbor clustering method. Hereinafter, a description will be given with reference to images illustrated in FIGS. 9A, 9B, 9C, and 9D.

When region splitting is performed by clustering on an image illustrated in FIG. 9A consisting of 8 vertical pixels and 16 horizontal pixels, the image is split into four regions. FIG. 9B illustrates, for each pixel, the number of distance calculations according to a conventional nearest neighbor clustering method. FIG. 9C illustrates, for each pixel, the number of distance calculations when calculating distances to clusters to which left adjacent pixels are allocated in steps S104 to S106 according to the present embodiment. FIG. 9D illustrates the number of distance calculations when first comparing distances to clusters to which left adjacent pixels are allocated and then comparing distances to clusters of upper adjacent pixels in steps S104 to S106 according to the present embodiment.

With a conventional nearest neighbor clustering method, while one distance calculation is performed per pixel up to a pixel 901, the number of distance calculations increases every time a new color appears, and four distance calculations are required for each pixel at and after a pixel 902. Therefore, in FIG. 9B, the number of distance calculations of the entire image data is 440.

On the other hand, with the image processing method according to the present embodiment, as illustrated in FIG. 9C, for example, only one distance calculation is necessary for the pixel 902 because a cluster is determined by a comparison with a cluster to which a left adjacent pixel is allocated. The number of distance calculations of the entire image data is 347. Furthermore, when comparisons with upper adjacent pixels are to be also performed, as illustrated in FIG. 9D, a pixel 903 only requires one computation and the number of distance calculations of the entire image data is 246.

As described above, the image processing method according to the present embodiment enables region splitting to be performed at a higher speed than a conventional nearest neighbor clustering method.

In addition, in the image processing method according to the present embodiment, when the distance between a processing object pixel and a cluster of a nearby pixel is large, a comparison is made with representative feature vectors of other clusters (steps S108 to S115). Therefore, a processing object pixel can be allocated to an optimal cluster even without having to perform grouping according to the conventional technique described in Japanese Patent Laid-Open No. 11-288465. For example, when performing region splitting on the image illustrated in FIG. 10A, according to a conventional technique, the image is first split into 5 regions illustrated in FIG. 10B and then integrated into the regions illustrated in FIG. 10C by grouping. On the other hand, with the image processing method according to the present embodiment, the image is split into the regions illustrated in FIG. 10C upon conclusion of clustering.

Furthermore, with the image processing method according to the present embodiment, a threshold T1 to be used when comparing with a cluster to which a nearby pixel is allocated (step S106) is set smaller than a threshold T2 for judging whether a new cluster is to be defined or not (step S115). An advantage thereof will be described with reference to the image illustrated in FIG. 11A.

For the sake of simplicity, the image illustrated in FIG. 11A is assumed to be a grayscale image and the respective numerical values are assumed to represent pixel values. FIG. 11B is a diagram illustrating a result of clustering when the threshold T1 and the threshold T2 are set to the same value. FIG. 11C is a diagram illustrating a result of clustering when the threshold T1 is set smaller than the threshold T2.

As illustrated in FIG. 11B, upon conclusion of the processing of a pixel 1101, a representative feature vector (mean pixel value) of a cluster including the pixel 1101 is 25. The feature vector (pixel value) of a pixel 1102 is 30. When the threshold T1 and the threshold T2 are both set to 5, as illustrated in FIG. 11B, the pixel 1102 is to be allocated to the same cluster to which the pixel 1101 is allocated. On the other hand, when the threshold T1 is set smaller than the threshold T2 (for example, T1=1 and T2=5), as illustrated in FIG. 11C, the pixel 1102 is to be allocated to a cluster to which a pixel 1100 having a smaller distance to a feature vector is allocated. As described above, the image processing method according to the present embodiment enables region splitting to be performed at high accuracy by setting the threshold T1 smaller than the threshold T2.

<Second Embodiment>

An image processing method according to a second embodiment of the present invention and a configuration of a vector data converting apparatus using the image processing method will now be described. A common feature of the image processing methods according to the present embodiment and the first embodiment is that a feature vector of a processing object pixel is first compared with representative feature vectors of clusters to which nearby pixels are allocated. However, the present embodiment differs from the first embodiment in that the number of clusters in an image is to be determined in advance. In the first embodiment, since clusters are to be defined during the process of judging which cluster a pixel of interest belongs to, the number of clusters increases as processing proceeds, thereby making it difficult to predict the number of clusters. In contrast, since the number of clusters is to be determined in advance in the present embodiment, the numbers of comparison processes of feature vectors and accompanying processes can be restricted and further acceleration of processing can be achieved.

Figures 12A, 12B, 12C:
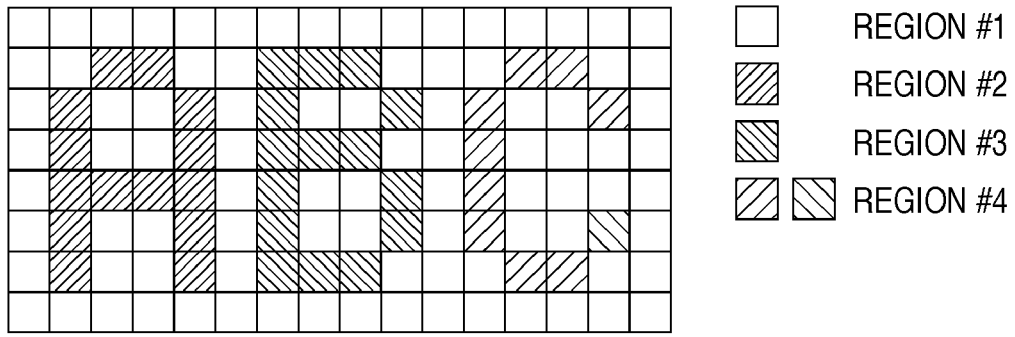
FIG. 12A, FIG. 12B, and FIG. 12C are diagrams illustrating the number of distance calculations in the image processing method according to the second embodiment.

Numbers of distance calculations will be described with reference to an image illustrated in FIG. 12A consisting of 8 vertical pixels and 16 horizontal pixels. When the number of clusters k is set to four, as illustrated in FIG. 12B, since a conventional K-means clustering method inevitably involves the execution of four distance calculations per pixel, 512 distance calculations are required for the entire image. On the other hand, with the image processing method according to the present embodiment, when a left adjacent pixel and an upper adjacent pixel are referenced as nearby pixels, the entire image only requires 262 distance calculations as illustrated in FIG. 12C. As described above, the image processing method according to the present embodiment enables region splitting at a higher speed than a conventional K-means clustering method.

The configuration of a vector data converting apparatus according to the present embodiment is the same as that described in the first embodiment according to the present invention (FIGS. 6A and 6B), and processing performed by the contour extracting unit 702 and the vector data generating unit 703 are also the same. The clustering unit 701 applies the image processing method according to the present embodiment to perform region splitting on an image. Hereinafter, operations of the clustering unit 701 according to the present embodiment will now be described in detail with reference to the flowcharts illustrated in FIGS. 2A and 2B.

The number of clusters k and representative feature vector initial values P1 to Pk of the k-number of clusters are defined (step S201). Since a method of defining the number of clusters k and a representative feature vector initial value of each cluster is known in the K-means clustering method in conventional art, only a brief description will now be provided. For example, k-number of pixels are randomly selected from images to be processed as representative points belonging to respective clusters. A feature vector of such a representative point becomes an initial representative feature vector of each cluster.

A feature vector Pc of a processing object pixel is acquired (step S202). A distance D (Pc, Pn) between the feature vector Pc and a representative feature vector Pn of a cluster Cn to which a nearby pixel is allocated is compared with a threshold T (steps S203 to S205). If the distance D (Pc, Pn) is less than or equal to the threshold T (YES in step S205), the processing object pixel is allocated to the cluster Cn (step S206), and processing proceeds to step S215. If not (NO in step S205), processing proceeds to step S207.

Steps S207 to S213 are processes for finding a cluster nearest to the feature vector of the processing object pixel from among the k-number of clusters. Hereinafter, steps S207 to S213 will be described.

In step S207, a loop index i is initialized. In addition, a variable min_distance representing a minimum distance among the distances between the feature vector of the processing object pixel and the representative feature vectors of the clusters is initialized by a constant MAX_VAL. In this case, a value greater than the maximum possible distance in a feature space is set as MAX_VAL. Furthermore, a variable n representing a cluster number of a cluster having a minimum distance to the feature vector of the processing object pixel is initialized.

A distance D (Pc, Pi) between the feature vector Pc of the processing object pixel and a representative feature vector Pi of a cluster Ci is calculated (steps S208 to S209) and compared with the variable min_distance (step S210). When the distance D (Pc, Pi) is less than or equal to the variable min_distance (YES in step S210), the distance D (Pc, Pi) is substituted into min_distance and the loop index i is substituted into the variable n (step S211), and processing proceeds to step S212. If not (NO in step S210), processing proceeds to step S212.

In step S212, 1 is added to the loop index i. In step S213, a judgment is made on whether or not comparisons between the feature vector Pc of the processing object pixel and the representative feature vectors of all clusters have been completed. If comparisons have been completed (YES in step S213), processing proceeds to step S214. If not (NO in step S213), processing proceeds to step S208.

Since the cluster Cn with the minimum distance to the feature vector of the processing object pixel has been selected through the processes of steps S207 to S213, the processing object pixel is allocated to the cluster Cn in step S214.

When all pixels in the image data are processed (YES in step S215), processing proceeds to step S216. If not (NO in step S215), processing returns to step S202 to set a subsequent pixel as a processing object.

In step S216, the representative feature vectors P1 to Pk of the k-number of clusters are respectively updated. However, if the representative feature vector of a cluster is a feature vector of the center of the cluster, only the representative feature vector of the cluster determined as being the cluster to which the pixel of interest belongs in step S214 need be updated. This is because a change in the center of cluster due to the allocation of a new pixel only occurs in this cluster. In step S217, judgments are respectively made regarding the representative feature vectors P1 to Pk on whether or not the difference between values before and after update is within a predetermined value. If the difference between the aforementioned values is within the predetermined value for all clusters (YES in step S217), processing of the clustering unit 701 is concluded. If not (NO in step S217), processing returns to step S202 to recommence processing from the first (when processing is performed in a raster scan order, from the top left) pixel of the image data.

As described above, in the image processing method according to the present embodiment, a feature vector of a processing object pixel is first compared with representative feature vectors of clusters to which nearby pixels are allocated (steps S202 to S205). Generally, since image data has a high correlation between adjacent pixels, it is highly probable that the processing object pixel is allocated to the same cluster as a nearby pixel. Therefore, the number of distance calculations can be reduced in comparison to a conventional K-means clustering method.

Numbers of distance calculations will be described with reference to an image illustrated in FIG. 12A consisting of 8 vertical pixels and 16 horizontal pixels. When the number of clusters k is set to 4, as illustrated in FIG. 12B, since a conventional K-means clustering method inevitably involves the execution of four distance calculations per pixel, 512 distance calculations are required for the entire image. On the other hand, with the image processing method according to the present embodiment, when a left adjacent pixel and an upper adjacent pixel are referenced as nearby pixels, the entire image only requires 262 distance calculations as illustrated in FIG. 12C. As described above, the image processing method according to the present embodiment enables region splitting at a higher speed than a conventional K-means clustering method.

<Third Embodiment>

Figure 8:
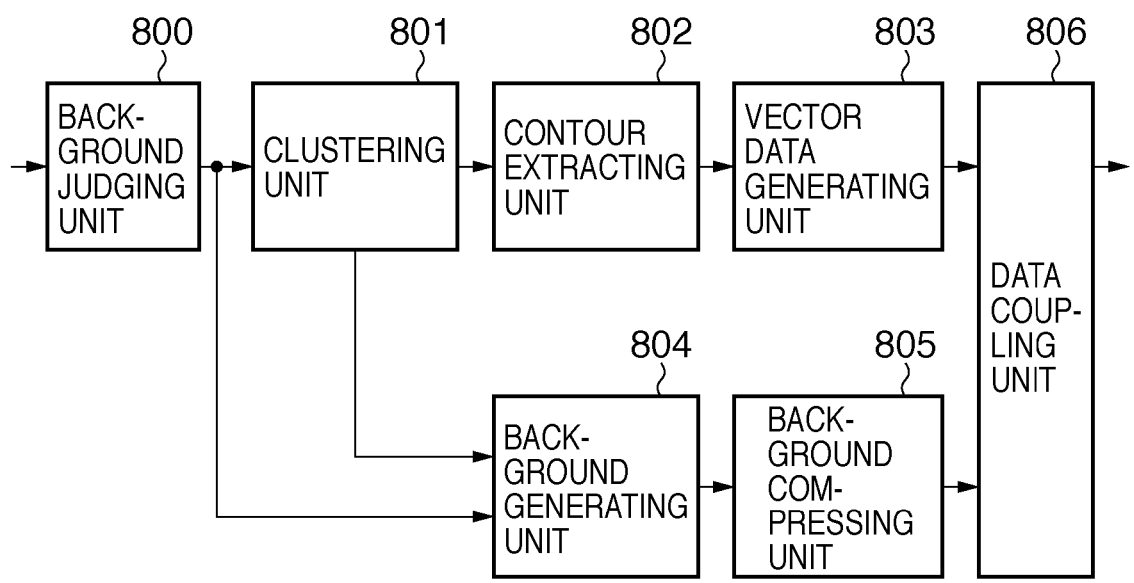
FIG. 8 is a block diagram illustrating a configuration of a vector data converting apparatus.

An image processing method according to a third embodiment of the present invention and a configuration of a vector data converting apparatus using the image processing method will now be described with reference to FIG. 8. In FIG. 8, reference numeral 800 denotes a background judging unit that judges whether each pixel in an inputted image is in the foreground or the background of the image. The background judging unit can also be referred to as a background identifying unit that identifies a background. A method of judging or identifying a background is known in Japanese Patent Laid-Open No. 2008-042345. For example, with background judgment, when creating image data, information such as a flag indicating background is set to pixels belonging to a background portion as an attribute of the pixels. By defining a background portion in advance in this manner, a background judgment can be made based on the attribute of a pixel. In addition, for example, in the case of image data optically read by a scanner, a paper color may be read, whereby a background pixel is to be judged based on the color. The background judging unit 800 outputs a background color, a pixel value of inputted image data, and a background flag indicating whether or not a pixel belongs to the background.

Reference numeral 801 denotes a clustering unit that applies the image processing method according to the present embodiment to perform region splitting on an image. One background color is inputted for each piece of image data to the clustering unit 801. The image data and a background flag are inputted in a raster scan order on a per-pixel basis. The clustering unit 801 outputs image data after region splitting, as well as a background color and a background flag corrected by clustering. Reference numeral 802 denotes a contour extracting unit that extracts a contour of each region split by the clustering unit 801. Reference numeral 803 denotes a vector data generating unit that generates vector data based on the contour extracted by the contour extracting unit 802. The vector data generating unit 803 generates vector data for regions other than the background. Reference numeral 804 denotes a background generating unit which, based on the background color and the background flag outputted by the background judging unit 800 or the clustering unit 801, fills in pixels other than the background among the image data with the background color and outputs the image data. Reference numeral 805 denotes a background compressing unit that compresses data outputted from the background generating unit 804. Reference numeral 806 denotes a data coupling unit that couples vector data outputted from the vector data generating unit 803 with compressed data outputted from the background compressing unit 805, and outputs a file.

Hereinafter, operations of the clustering unit 801 will be described in detail with reference to the flowcharts illustrated in FIGS. 3A and 3B. First, in step S301, a variable num_cluster representing the number of clusters is initialized to 1, and a representative feature vector of a cluster Cb representing a background (hereinafter referred to as a "background cluster") is set to a background color outputted from the background judging unit 800. In step S302, a feature vector Pc of a processing object pixel is acquired.

In step S303, based on a background flag outputted from the background judging unit 800, a judgment is made on whether or not the processing object pixel is a pixel belonging to the background (hereinafter referred to as a "background pixel"). If the pixel is a background pixel (YES in step S303), processing proceeds to step S304. If not (NO in step S303), processing proceeds to step S308. In step S304, a distance D (Pc, Pb) between the feature vector Pc of the processing object pixel and the representative feature vector Pb of the background cluster Cb is calculated. In step S305, a judgment is made on whether or not the distance D (Pc, Pb) is less than or equal to a third threshold T3. The distance D (Pc, Pb) will also be referred to as a third distance. When the distance D (Pc, Pb) is less than or equal to the threshold T3 (third threshold) (YES in step S305), processing proceeds to step S306. If not (NO in step S305), processing proceeds to step S308. In the present embodiment, the threshold T3 is assumed to be a value smaller than a threshold T2 to be used in step S315.

In step S306, the processing object pixel is allocated to the background cluster Cb. In step S307, the representative feature vector Pb of the cluster Cb is updated. Subsequently, processing proceeds to step S319.

Steps S308 to S318 are processes for selecting a cluster whose distance to the feature vector Pc of the processing object pixel is closest among all clusters, and either allocating the processing object pixel to the selected cluster or defining a new cluster. Since the processes are the same as those of steps S108 to S117 of the image processing method of the first embodiment (FIGS. 1A and 1B) of the present invention, a description thereof will be omitted.

When all pixels in the image data are processed (YES in step S319), processing of the clustering unit 801 is concluded. If not (NO in step S319), processing returns to step S302 and sets a subsequent pixel as a processing object.

As described above, with the image processing method according to the present embodiment, when a processing object pixel is judged to be a background pixel, a feature vector of the processing object pixel is first compared with representative feature vectors of background clusters (steps S303 to S305). For example, document data read by a scanner generally includes a high proportion of margins. Accordingly, it is highly probable that a clustering object pixel is in the background. Therefore, the number of distance calculations can be reduced in comparison to a conventional nearest neighbor clustering method. A description will now be given with reference to the images illustrated in FIGS. 13A to 13C.

Figures 13A, 13B, 13C:
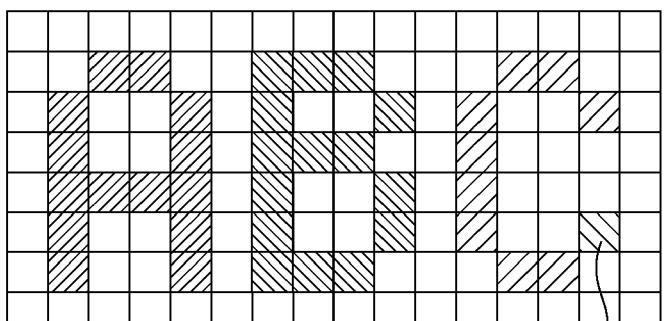
FIG. 13A, FIG. 13B, and FIG. 13C are diagrams illustrating the number of distance calculations in the image processing method according to the third embodiment.

FIG. 13B illustrates the number of distance calculations executed at each pixel when region splitting is performed on the image illustrated in FIG. 13A using a conventional nearest neighbor clustering method. FIG. 13C illustrates the number of distance calculations (steps S304 and S310) executed at each pixel when region splitting is performed on the image illustrated in FIG. 13A using a method according to the present embodiment. In FIGS. 13A to 13C, it is assumed that white pixels have been judged by the background judging unit 800 to be background pixels. In addition, the pixel denoted by reference numeral 1201 in FIG. 13A is assumed not to be a part of the background but has been erroneously judged by the background judging unit 800 to be a background pixel. In FIG. 13B, it is shown that a conventional nearest neighbor clustering method requires 440 distance calculations. In contrast, FIG. 13C shows that the image processing method according to the present embodiment only requires 236 distance calculations.

As described above, the image processing method according to the present embodiment is capable of reducing the number of distance calculations compared to conventional methods and therefore enables region splitting to be performed at higher speeds. In addition, with the image processing method according to the present embodiment, when a pixel is judged to be a background pixel, a distance to a background cluster is compared with a threshold. When the distance is greater than the threshold, clustering is performed on the assumption that the pixel is an ordinary pixel. Therefore, accurate region splitting can be performed even when an erroneous judgment is made by the background judging unit 800 as was the case of the pixel 1201 illustrated in FIG. 13A.

Figure 3A:
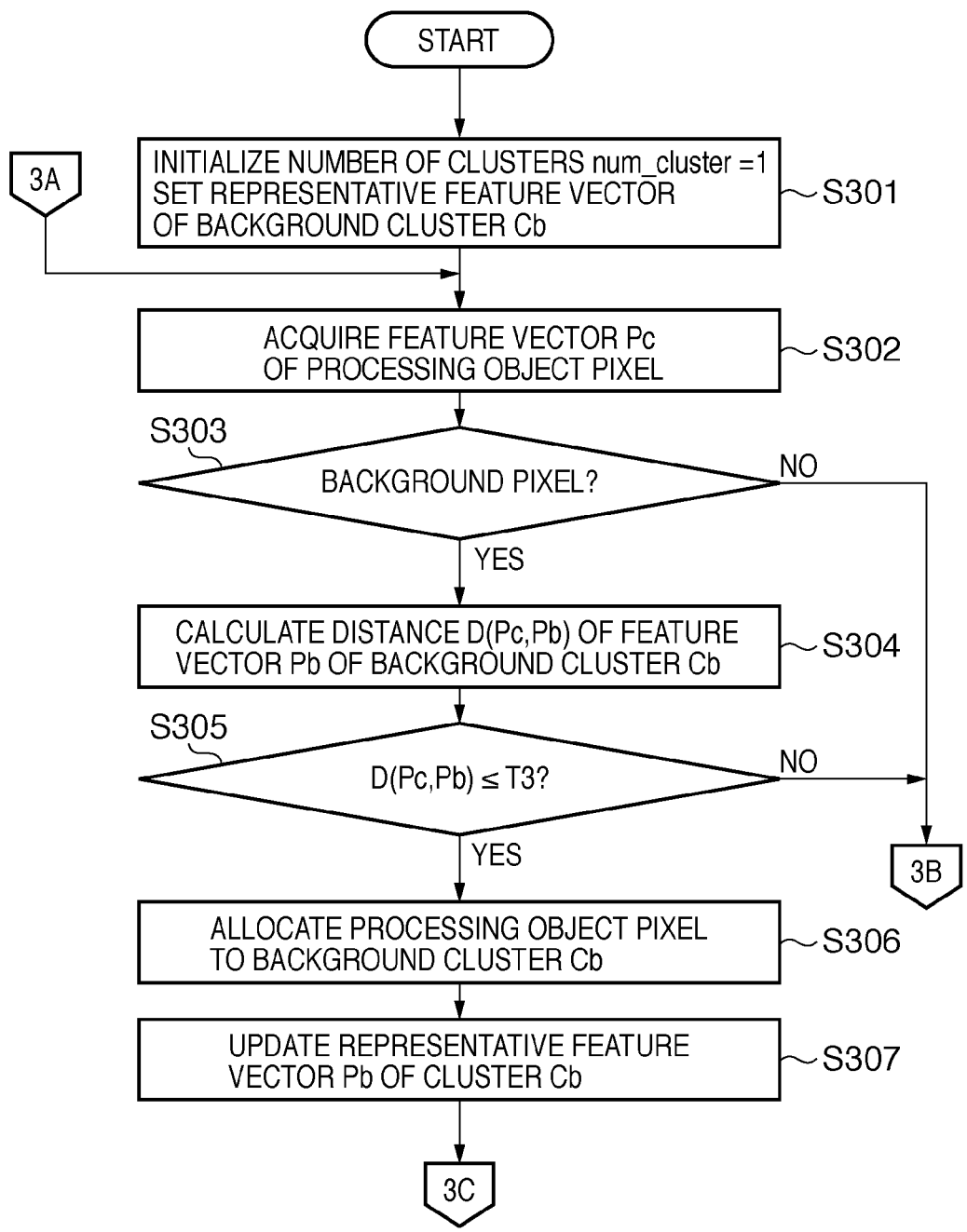

In the image processing method according to the present embodiment, a representative feature vector Pb of a background cluster Cb or, in other words, a background color, is updated in step S307 illustrated in FIG. 3A. However, the present invention is not limited to this arrangement. The representative feature vector Pb need not be updated when faster region splitting is desired. In this case, the background generating unit 804 illustrated in FIG. 8 performs hole plugging using the background color outputted from the background judging unit 800.

In addition, when the processing object pixel is judged to be a background pixel in step S303, the processing object pixel may be allocated as-is to a background cluster. For example, in step S304, instead of calculating the distance D (Pc, Pb), a value less than or equal to the threshold T3 may be set as D (Pc, Pb). In this case, while region splitting accuracy is reduced in comparison to the image processing method according to the present embodiment, processing speed can be further increased. Whether or not the series of processes of steps S304 to S307 is to be executed may be determined according to a required processing time and a splitting accuracy of region splitting.

<Fourth Embodiment>

An image processing method according to a fourth embodiment of the present invention and a configuration of a vector data converting apparatus using the image processing method will now be described. FIG. 8 is a block diagram illustrating a configuration of a vector data converting apparatus and is the same as that described in the third embodiment of the present invention. Since a clustering unit 801 that applies the image processing method according to the present embodiment to perform region splitting on an image differs from the third embodiment, a detailed description will be given with reference to FIGS. 4A and 4B.

Figure 4A:
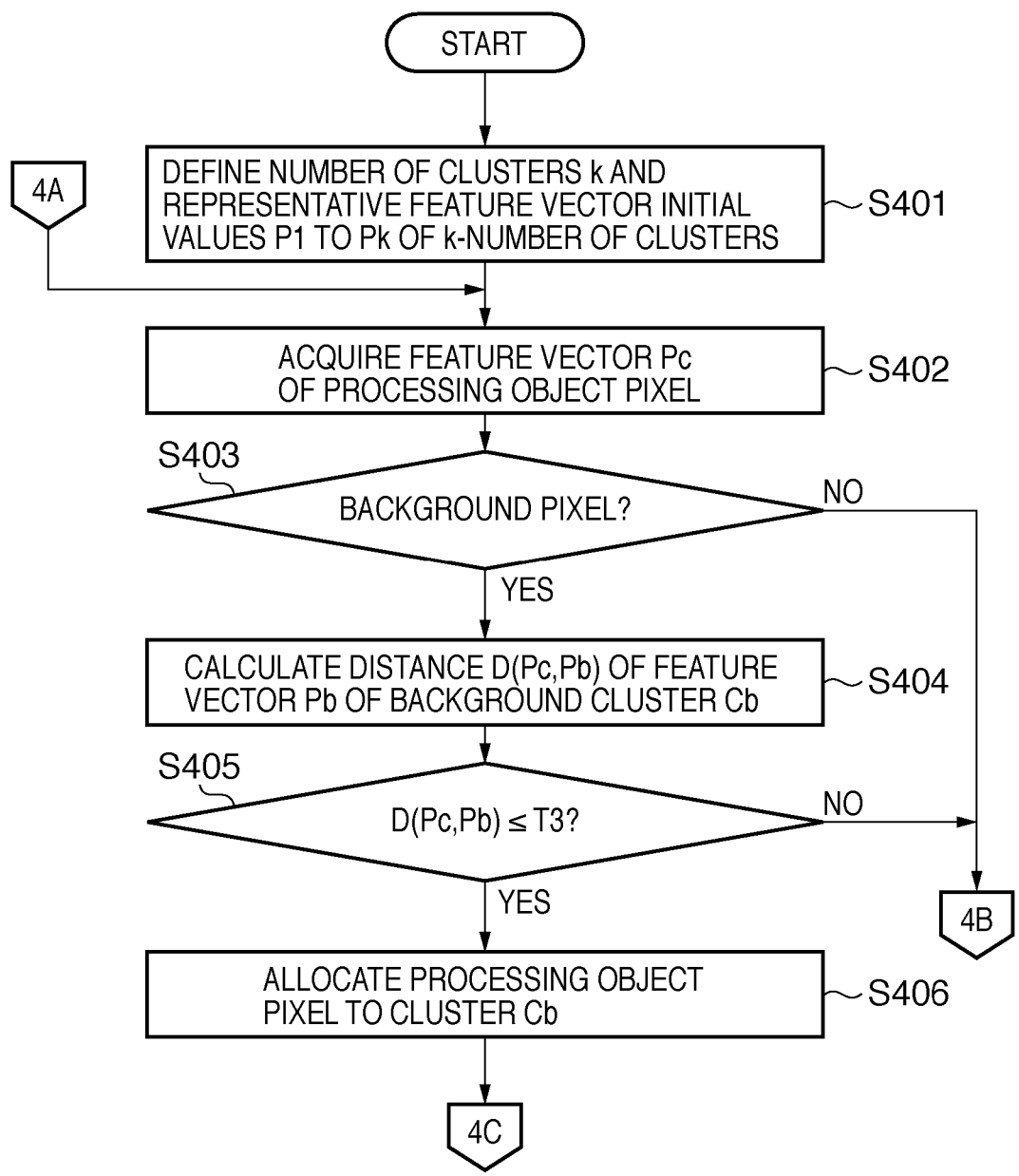

FIGS. 4A and 4B are flowcharts illustrating specific processes of the image processing method according to the present embodiment. The number of clusters k and representative feature vector initial values P1 to Pk of the k-number of clusters are defined (step S401). At this point, one of the k-number of clusters is assumed to be a background cluster. A background color outputted from the background judging unit 800 is set as a representative feature vector of the background cluster. Representative feature vector initial values of the other clusters may be set using a known method in a conventional K-means clustering method.

A feature vector Pc of a processing object pixel is acquired (step S402). A judgment on whether or not the processing object pixel is a background pixel is made based on a background flag outputted from the background judging unit 800 (step S403). If the processing object pixel is a background pixel (YES in step S403), processing proceeds to step S404. If not (NO in step S403), processing proceeds to step S407.

With a background pixel, a distance D (Pc, Pb) between a feature vector Pc of the processing object pixel and a representative feature vector Pb of a background cluster Cb is calculated (step S404). A judgment is made on whether the distance D (Pc, Pb) is less than or equal to a threshold T3 (step S405). If the distance D (Pc, Pb) is less than or equal to the threshold T3 (YES in step S405), the processing object pixel is allocated to the cluster Cb (step S406), and processing proceeds to step S415. If not (NO in step S405), processing proceeds to step S407.

Steps S407 to S414 are processes for selecting a cluster nearest to the feature vector of the processing object pixel from among the k-number of clusters, and allocating the processing object pixel to the selected cluster. Step S415 is a process for judging whether or not all pixels in the image have been processed. Steps S416 and S417 are processes for respectively updating the representative feature vectors P1 to Pk of the clusters, and judging whether or not processing of the clustering unit 801 is to be concluded. Since the processes are the same as those of steps S207 to S217 of the second embodiment (FIGS. 2A and 2B) of the present invention, a description thereof will be omitted.

Figures 14A, 14B, 14C:
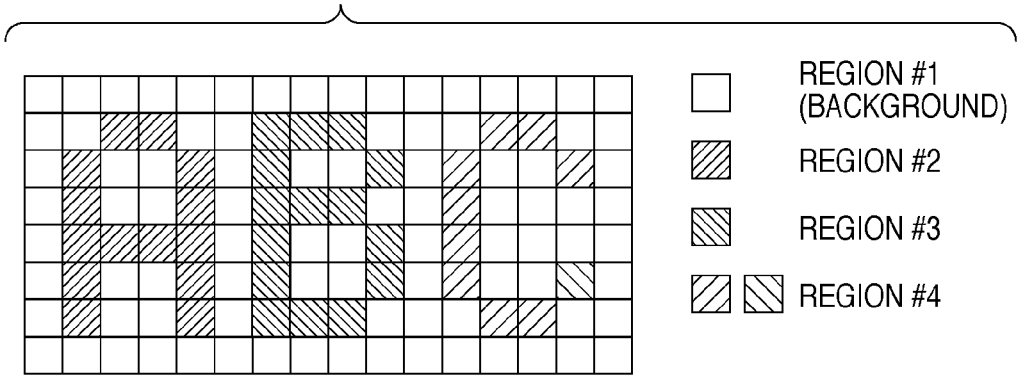
FIG. 14A, FIG. 14B, and FIG. 14C are diagrams illustrating the number of distance calculations in the image processing method according to the fourth embodiment.

As described above, with the image processing method according to the present embodiment, when the processing object pixel is a background pixel, a comparison is first performed against the representative feature vector of a background cluster. When performing region splitting on the image data illustrated in FIG. 14A, a conventional K-means clustering method requires that four distance calculations be performed on each of the pixels as illustrated in FIG. 14B. On the other hand, as illustrated in FIG. 14C, since the image processing method according to the present embodiment only requires one distance calculation per one background pixel (region #1), region splitting can be performed at a higher speed as compared to conventional methods.

<Fifth Embodiment>

An image processing method according to a fifth embodiment of the present invention and a configuration of a vector data converting apparatus using the image processing method will now be described. FIG. 8 is a block diagram illustrating a configuration of a vector data converting apparatus and is the same as that described in the third embodiment of the present invention. Since a clustering unit 801 that applies the image processing method according to the present embodiment to perform region splitting on an image differs from that in the third embodiment, a description will be given with reference to FIGS. 5A and 5B.

Figure 5A:
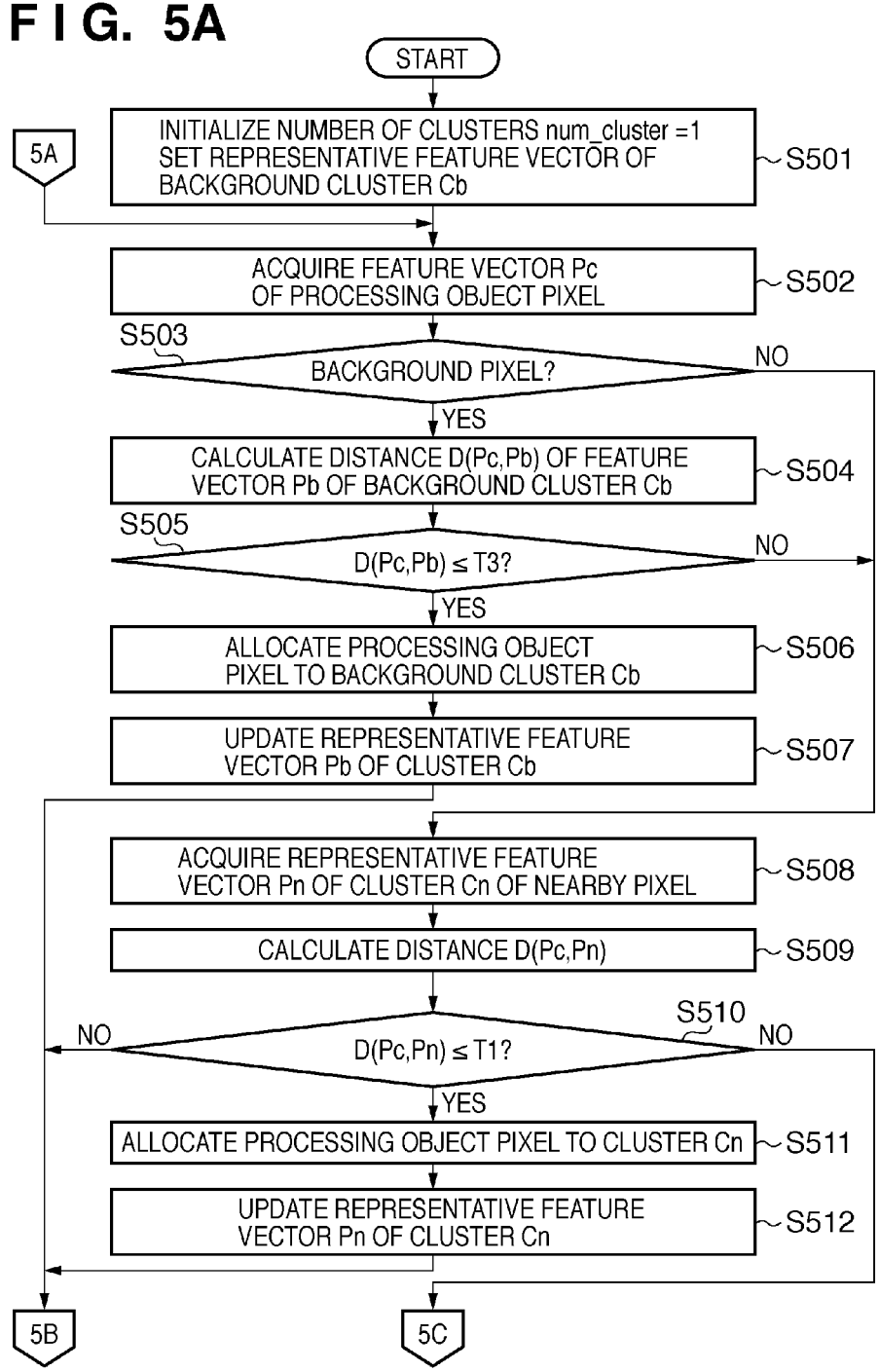
FIG. 5A and FIG. 5B are flowcharts illustrating specific processes of an image processing method according to a fifth embodiment.
Figure 5B:
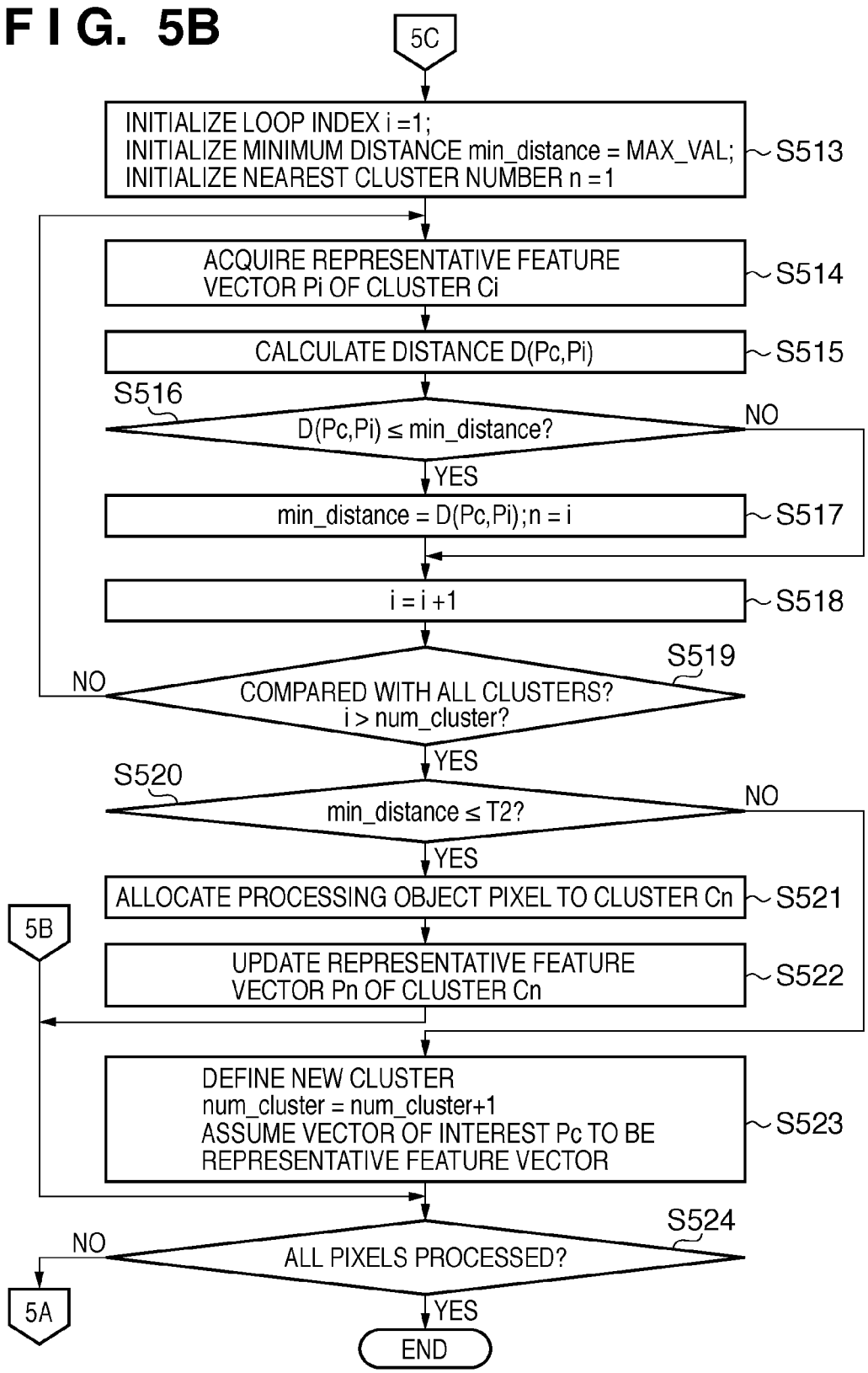

FIGS. 5A and 5B are flowcharts illustrating specific processes of the image processing method according to the present embodiment. First, in step S501, a variable num_cluster representing the number of clusters is initialized to 1 and a background color outputted from the background judging unit 800 is set to a representative feature vector of a background cluster Cb. In step S502, a feature vector Pc of a processing object pixel is acquired.

Steps S503 to S507 are processes performed when the processing object pixel is a background pixel to compare a distance to a representative feature vector of the background cluster (also referred to as a third distance) with a third threshold T3, and if the distance is less than or equal to the third threshold, allocate the processing object pixel to the background cluster. These steps will also be referred to as a third allocating step. The processes are the same as those of steps S303 to S307 of the third embodiment (FIGS. 3A and 3B).

Steps S508 to S512 are processes for comparing a distance to a representative feature vector of a cluster to which a nearby pixel of the processing object pixel is allocated with a first threshold T1, and if the distance is less than or equal to the threshold T1, allocating the processing object pixel to the cluster. The processes are the same as those of steps S104 to S107 of the first embodiment (FIGS. 1A and 1B).

Steps S513 to S523 are processes for selecting a cluster whose distance to the feature vector Pc of the processing object pixel is closest among all clusters, and either allocating the processing object pixel to the selected cluster or defining a new cluster. The processes are the same as those of steps S108 to S117 of the image processing method of the first embodiment (FIGS. 1A and 1B) of the present invention.

When all pixels in the image data are processed (YES in step S524), processing of the clustering unit 801 is concluded. If not (NO in step S524), processing returns to step S502 and sets a subsequent pixel as a processing object.

As described above, with the image processing method according to the present embodiment, when a processing object pixel is judged to be a background pixel, a feature vector of the processing object pixel is first compared with representative feature vectors of background clusters (steps S503 to S505). In addition, if the processing object pixel is not a background pixel, the processing object pixel is first compared with representative feature vectors of clusters to which nearby pixels are allocated (steps S508 to S510).

Figures 15A, 15B, 15C, 15D:
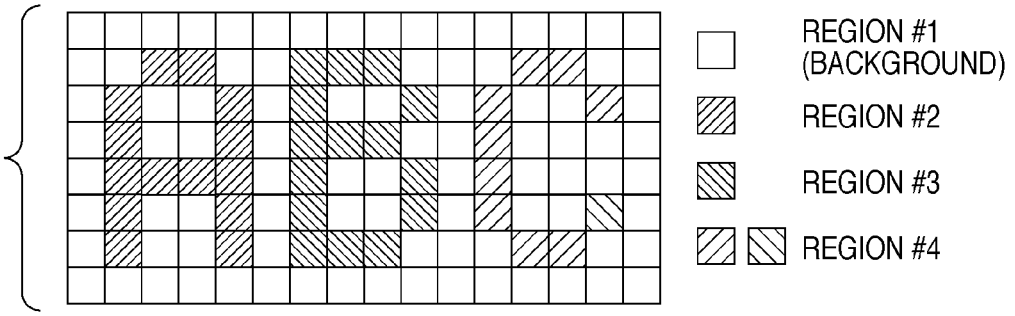
FIG. 15A, FIG. 15B, FIG. 15C, and FIG. 15D are diagrams illustrating the number of distance calculations in the image processing method according to the fifth embodiment.

The number of distance calculations on distances between the feature vector of the processing object pixel and representative feature vectors of clusters according to the present embodiment will now be described with reference to FIGS. 15A to 15D. FIG. 15B illustrates, per pixel, the number of distance calculations when region splitting is performed on the image illustrated in FIG. 15A using a conventional nearest neighbor clustering method. FIG. 15C illustrates, per pixel, the number of distance calculations when left adjacent pixels are used as nearby pixels in steps S508 to S510 in the image processing method according to the present embodiment. FIG. 15D illustrates, per pixel, the number of distance calculations when, first, left adjacent pixels, and then upper adjacent pixels, are used in steps S508 to S510 in the image processing method according to the present embodiment.

In FIGS. 15A to 15D, it is shown that while a conventional nearest neighbor clustering method requires 440 calculations, the number of calculations can be reduced to either 230 (FIG. 15B) or 194 (FIG. 15C) according to the present embodiment. Therefore, faster region splitting as compared to conventional methods can be achieved.

<Sixth Embodiment>

An image processing method according to a sixth embodiment of the present invention and a configuration of a vector data converting apparatus using the image processing method will now be described. FIG. 8 is a diagram illustrating a configuration of a vector data converting apparatus and is the same as that described in the fourth embodiment of the present invention. Since a clustering unit 801 that applies the image processing method according to the present embodiment to perform region splitting on an image differs from the fourth embodiment, a description will be given with reference to FIGS. 6A and 6B.

Figure 6A:
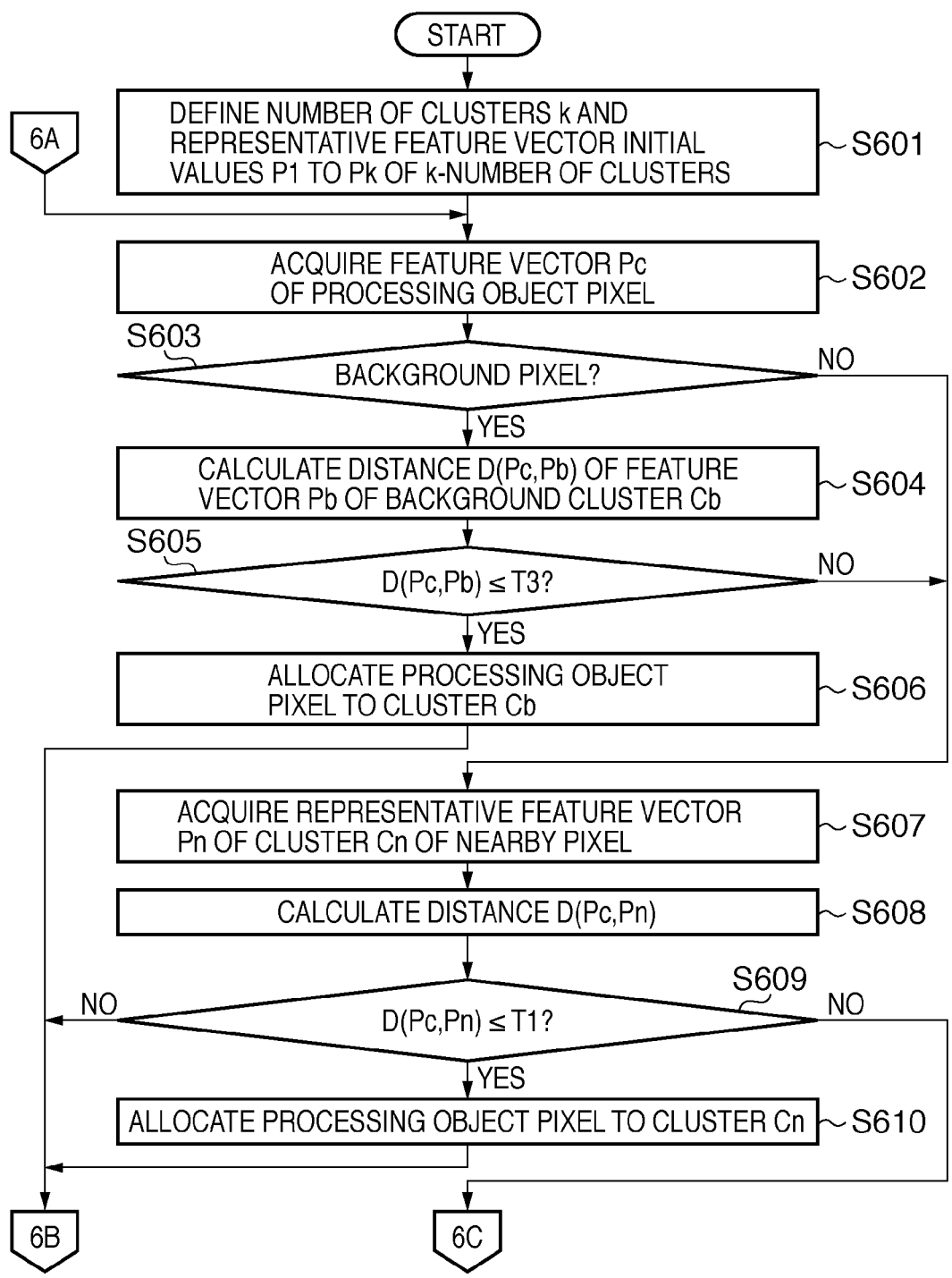
FIG. 6A and FIG. 6B are flowcharts illustrating specific processes of an image processing method according to a sixth embodiment.
Figure 6B:
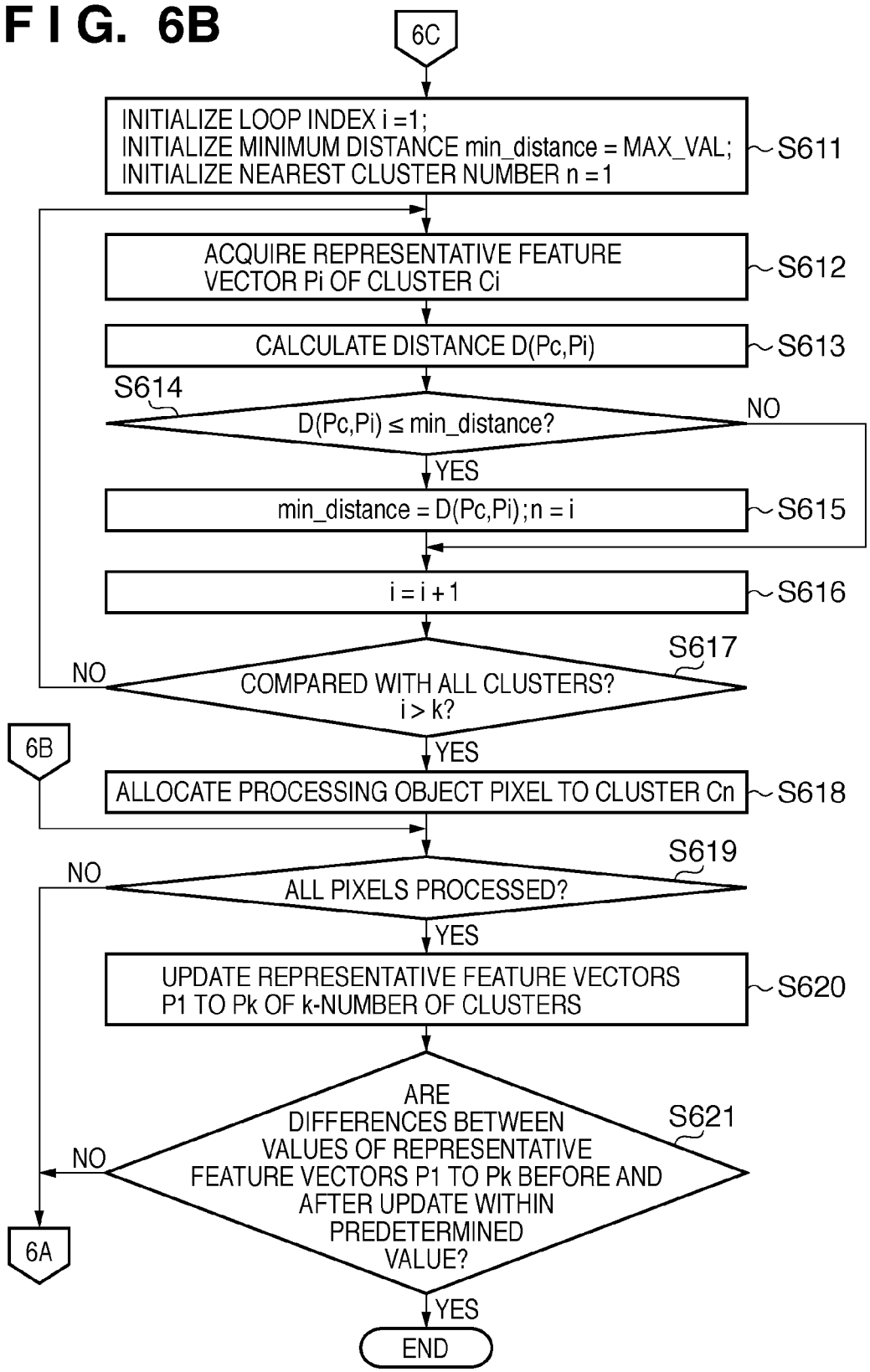

FIGS. 6A and 6B are flowcharts illustrating specific processes of the image processing method according to the present embodiment. Step S601 is a process for defining the number of clusters k and representative feature vector initial values P1 to Pk of the k-number of clusters. One of the k-number of clusters is assumed to be a background cluster. This process is the same as that of step S401 of the fourth embodiment (FIGS. 4A and 4B) of the present invention.

A feature vector Pc of a processing object pixel is acquired (step S602). Steps S603 to S606 are processes performed when the processing object pixel is a background pixel to compare a distance to a representative feature vector of the background cluster with a threshold T3, and if the distance is within the threshold, allocate the processing object pixel to the background cluster. The processes are the same as those of steps S402 to S406 of the fourth embodiment (FIGS. 4A and 4B).

Figure 2A:
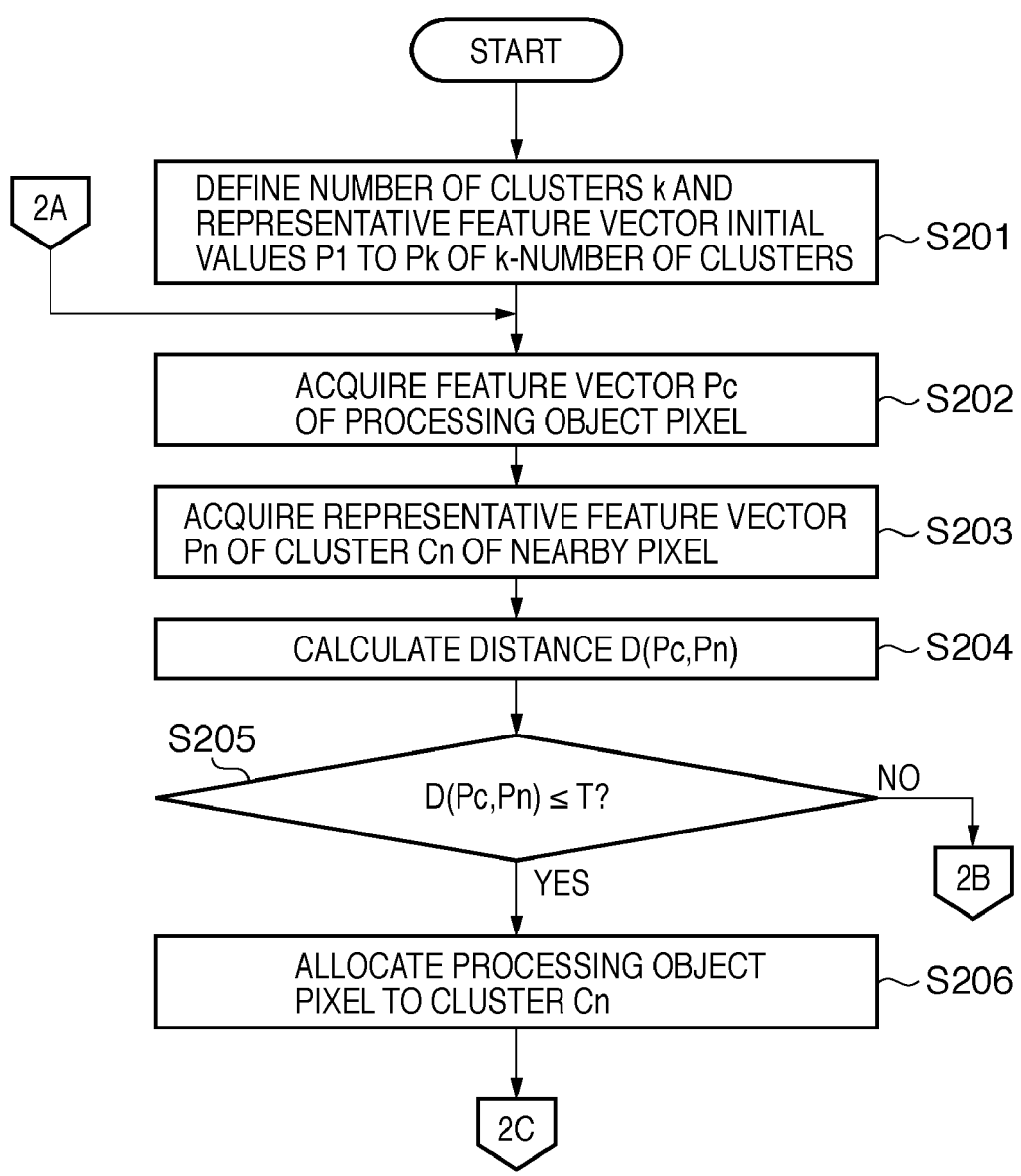

Steps S607 to S610 are processes performed to compare a distance to a representative feature vector of a cluster to which a nearby pixel of the processing object pixel is allocated to a threshold T1, and if the distance is within the threshold, allocate the processing object pixel to the cluster. The processes are the same as those of steps S202 to S206 of the second embodiment (FIGS. 2A and 2B).

Steps S611 to S618 are processes for selecting a cluster whose distance to the feature vector of the processing object pixel is closest from among the k-number of clusters, and allocating the processing object pixel to the selected cluster. Step S619 is a process for judging whether or not all pixels in the image have been processed. Steps S620 and S621 are processes for respectively updating the representative feature vectors P1 to Pk of the clusters, and judging whether or not processing of the clustering unit 801 is to be concluded. The processes are the same as those of steps S207 to S217 of the image processing method of the second embodiment (FIGS. 2A and 2B) of the present invention.

As described above, with the image processing method according to the present embodiment, when a processing object pixel is judged to be a background pixel, a feature vector of the processing object pixel is first compared with representative feature vectors of background clusters (steps S603 to S605). In addition, if the processing object pixel is not a background pixel, the processing object pixel is first compared with representative feature vectors of clusters to which nearby pixels are allocated (steps S607 to S609).

Figures 16A, 16B, 16C:
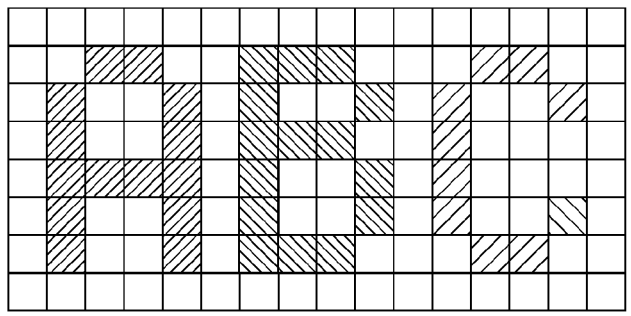
FIG. 16A, FIG. 16B, and FIG. 16C are diagrams illustrating the number of distance calculations in the image processing method according to the sixth embodiment.

The number of calculations and comparisons on distances between the feature vector of the processing object pixel and representative feature vectors of clusters according to the present embodiment will now be described with reference to FIGS. 16A to 16C. FIG. 16B illustrates, per pixel, the number of distance calculations required when region splitting is performed on the image illustrated in FIG. 16A using a conventional K-means clustering method. FIG. 16C illustrates, per pixel, the number of distance calculations required when, first, left adjacent pixels, and then upper adjacent pixels, are used in steps S607 to S609 in the image processing method according to the present embodiment.

In FIG. 16B, it is shown that a conventional K-means clustering method requires 512 distance calculations. However, in FIG. 16C, it is shown that the number of distance calculations can be reduced to 199 in the present embodiment. Therefore, faster region splitting as compared to conventional methods can be achieved.

<Other Embodiments>

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-026689, filed Feb. 6, 2009 and Japanese Patent Application No. 2009-026690, filed Feb. 6, 2009, which are hereby incorporated by reference herein in their entirety.

What is claimed is:

1. An image processing method for splitting image data into a plurality of clusters, the image processing method comprising:
    a first distance calculating step of calculating a first distance that is the distance between a feature vector of a processing object pixel and a representative feature vector of a cluster to which a nearby pixel of the processing object pixel belongs;
    a first allocating step of allocating the processing object pixel to the cluster to which the nearby pixel belongs when the first distance is less than or equal to a first threshold;
    a second distance calculating step of respectively calculating, when there are defined clusters and the first distance is greater than the first threshold, distances between the feature vector of the processing object pixel and representative feature vectors of the respective defined clusters, and calculating a second distance that is a minimum distance among the respective calculated distances; and
    a second allocating step of allocating the processing object pixel to a cluster corresponding to the second distance when the second distance is less than or equal to the second threshold, and newly defining a cluster to which the processing object pixel is to be allocated when there are no defined clusters or when the second distance is greater than the second threshold and allocating the processing object pixel to the newly defined cluster.

2. The image processing method according to claim 1, wherein the value of the first threshold is smaller than that of the second threshold.

3. The image processing method according to claim 1, wherein in said first distance calculating step, the number of pixels to be referenced as nearby pixels is determined according to the capacity of a memory storing information on nearby pixels.

4. The image processing method according to claim 1, wherein
    the image data includes a defined background portion, the image processing method further comprising before said first distance calculating step:

a third distance calculating step of calculating a third distance that is the distance between a feature vector of the processing object pixel and a representative feature vector of a cluster of the background portion; and a third allocating step of allocating the processing object pixel to a cluster to which the background portion belongs when the third distance is less than or equal to a third threshold.

5. The image processing method according to claim 1, wherein the feature vector of the processing object pixel is a color value of the pixel in a color space and the representative feature vector of the cluster is a mean value of feature vectors of pixels belonging to the cluster.

6. An image processing method for splitting image data into a plurality of clusters for which representative feature vectors have been defined in advance, the image processing method comprising:

a first distance calculating step of calculating a first distance that is the distance between a feature vector of a processing object pixel and a representative feature vector of a cluster to which a nearby pixel of the processing object pixel belongs;

a first allocating step of allocating the processing object pixel to the cluster to which the nearby pixel belongs when the first distance is less than or equal to a first threshold; and a second allocating step of calculating distances between the feature vector of the processing object pixel and respective representative feature vectors of the plurality of clusters determined in advance when the first distance is greater than the first threshold, and allocating the processing object pixel to a cluster having a minimum distance.

7. The image processing method according to claim 6, wherein in said first distance calculating step, the number of pixels to be referenced as nearby pixels is determined according to the capacity of a memory storing information on nearby pixels.

8. The image processing method according to claim 6, wherein the image data includes a defined background portion, the image processing method further comprising before said first distance calculating step:

a third distance calculating step of calculating a third distance that is the distance between a feature vector of the processing object pixel and a representative feature vector of a cluster of the background portion; and a third allocating step of allocating the processing object pixel to a cluster to which the background portion belongs when the third distance is less than or equal to a third threshold.

9. The image processing method according to claim 6, wherein the feature vector of the processing object pixel is a color value of the pixel in a color space and the representative feature vector of the cluster is a mean value of feature vectors of pixels belonging to the cluster.

10. An image processing apparatus that splits image data into a plurality of clusters, the image processing apparatus comprising:

a first distance calculator configured to calculate a first distance that is the distance between a feature vector of a processing object pixel and a representative feature vector of a cluster to which a nearby pixel of the processing object pixel belongs;

a first allocating unit configured to allocate the processing object pixel to the cluster to which the nearby pixel belongs when the first distance is less than or equal to a first threshold;

a second distance calculator configured to calculate respectively, when there are defined clusters and the first distance is greater than the first threshold, distances between the feature vector of the processing object pixel and representative feature vectors of the respective defined clusters, and calculate a second distance that is a minimum distance among the respective calculated distances; and a second allocating unit configured to allocate the processing object pixel to a cluster corresponding to the second distance when the second distance is less than or equal to the second threshold, and newly defines a cluster to which the processing object pixel is to be allocated when there are no defined clusters or when the second distance is greater than the second threshold and allocates the processing object pixel to the newly defined cluster.

11. An image processing apparatus that splits image data into a plurality of clusters for which representative feature vectors have been defined in advance, the image processing apparatus comprising:

a first distance calculator that calculates a first distance that is the distance between a feature vector of a processing object pixel and a representative feature vector of a cluster to which a nearby pixel of the processing object pixel belongs;

a first allocating unit that allocates the processing object pixel to the cluster to which the nearby pixel belongs when the first distance is less than or equal to a threshold; and a second allocating unit that calculates distances between the feature vector of the processing object pixel and respective representative feature vectors of the plurality of clusters determined in advance when the first distance is greater than the threshold, and allocates the processing object pixel to a cluster having a minimum distance.

12. A computer-readable recording medium on which is recorded a program that causes a computer to execute an image processing method for splitting image data into a plurality of clusters, said method comprising:

a first distance calculating step of calculating a first distance that is the distance between a feature vector of a processing object pixel and a representative feature vector of a cluster to which a nearby pixel of the processing object pixel belongs;

a first allocating step of allocating the processing object pixel to the cluster to which the nearby pixel belongs when the first distance is less than or equal to a first threshold;

a second distance calculating step of respectively calculating, when there are defined clusters and the first distance is greater than the first threshold, distances between the feature vector of the processing object pixel and representative feature vectors of the respective defined clusters, and calculating a second distance that is a minimum distance among the respective calculated distances; and a second allocating step of allocating the processing object pixel to a cluster corresponding to the second distance when the second distance is less than or equal to the second threshold, and newly defining a cluster to which the processing object pixel is to be allocated when there are no defined clusters or when the second distance is greater than the second threshold and allocating the processing object pixel to the newly defined cluster.

13. A computer-readable recording medium on which is recorded a program that causes a computer to execute an image processing method for splitting image data into a plurality of clusters for which representative feature vectors have been defined in advance, said method comprising:
- a first distance calculating step of calculating a first distance that is the distance between a feature vector of a processing object pixel and a representative feature vector of a cluster to which a nearby pixel of the processing object pixel belongs;
- a first allocating step of allocating the processing object pixel to the cluster to which the nearby pixel belongs when the first distance is less than or equal to a first threshold; and
- a second allocating step of calculating distances between the feature vector of the processing object pixel and respective representative feature vectors of the plurality of clusters determined in advance when the first distance is greater than the first threshold, and allocating the processing object pixel to a cluster having a minimum distance.

14. An image processing method for splitting image data into a plurality of clusters, the image processing method comprising:
- a background identifying step of identifying pixels belonging to a background portion;
- a third distance calculating step of calculating a third distance that is the distance between a feature vector of a processing object pixel and a representative feature vector of a background cluster that corresponds to the background portion;
- a third allocating step of allocating the processing object pixel to the background cluster when the third distance is less than or equal to a third threshold;
- a second distance calculating step of respectively calculating, when there are defined clusters and the third distance is greater than the third threshold, distances between the feature vector of the processing object pixel and representative feature vectors of the respective defined clusters, and calculating a second distance that is a minimum distance among the respective calculated distances; and
- a second allocating step of allocating the processing object pixel to a cluster corresponding to the second distance when the second distance is less than or equal to the second threshold, and newly defining a cluster to which the processing object pixel is to be allocated when there are no defined clusters or when the second distance is greater than the second threshold and allocating the processing object pixel to the newly defined cluster.

15. The image processing method according to claim 14, wherein the third threshold is smaller than the second threshold.

16. The image processing method according to claim 14, wherein, in said third distance calculating step, the process of calculating the third distance is not performed when the processing object pixel belongs to the background cluster, and the third distance is set to a value less than or equal to the third threshold.

17. The image processing method according to claim 16, wherein in said third distance calculating step, whether the third distance is to be calculated or not is selected according to required processing time and splitting accuracy.

18. The image processing method according to claim 14, wherein the feature vector of the processing object pixel is a color value of the pixel in a color space and the representative feature vector of the cluster is a mean value of feature vectors of pixels belonging to the cluster.

19. An image processing method for splitting image data into a plurality of clusters for which representative feature vectors have been defined in advance, the image processing method comprising:
- a background identifying step of identifying pixels belonging to a background portion;
- a third distance calculating step of calculating a third distance that is the distance between a feature vector of a processing object pixel and a representative feature vector of a background cluster that corresponds to the background portion;
- a third allocating step of allocating the processing object pixel to the background cluster when the third distance is less than or equal to a third threshold; and
- a second allocating step of respectively calculating distances between the feature vector of the processing object pixel and representative feature vectors of the plurality of clusters determined in advance when the third distance is greater than the third threshold and allocating the processing object pixel to a cluster whose distance is closest.

20. The image processing method according to claim 19, wherein the feature vector of the processing object pixel is a color value of the pixel in a color space and the representative feature vector of the cluster is a mean value of feature vectors of pixels belonging to the cluster.

21. An image processing apparatus that splits image data into a plurality of clusters, the image processing apparatus comprising:
- a background identifying unit configured to identify pixels belonging to a background portion;
- a third distance calculating unit configured to calculate a third distance that is the distance between a feature vector of a processing object pixel and a representative feature vector of a background cluster that corresponds to the background portion;
- a third allocating unit configured to allocate the processing object pixel to the background cluster when the third distance is less than or equal to a third threshold;
- a second distance calculating unit configured to calculate respectively, when there are defined clusters and the third distance is greater than the third threshold, distances between the feature vector of the processing object pixel and representative feature vectors of the respective defined clusters, and calculate a second distance that is a minimum distance among the respective calculated distances; and
- a second allocating unit configured to allocate the processing object pixel to a cluster corresponding to the second distance when the second distance is less than or equal to the second threshold, and define newly a cluster to which the processing object pixel is to be allocated when there are no defined clusters or when the second distance is greater than the second threshold and allocate the processing object pixel to the newly defined cluster.

22. An image processing apparatus that splits image data into a plurality of clusters for which representative feature vectors have been defined in advance, the image processing apparatus comprising:
- a background identifying unit configured to identify pixels belonging to a background portion;
- a third distance calculating unit configured to calculate a third distance that is the distance between a feature vector of a processing object pixel and a representative feature vector of a background cluster that corresponds to the background portion;

a third allocating unit configured to allocate the processing object pixel to the background cluster when the third distance is less than or equal to a third threshold; and a second allocating unit configured to calculate respectively distances between the feature vector of the processing object pixel and representative feature vectors of the plurality of clusters determined in advance when the third distance is greater than the third threshold and allocate the processing object pixel to a cluster whose distance is closest.

23. A computer-readable recording medium on which is recorded a program that causes a computer to execute an image processing method for splitting image data into a plurality of clusters, said method comprising:

a background identifying step of identifying pixels belonging to a background portion;

a third distance calculating step of calculating a third distance that is the distance between a feature vector of a processing object pixel and a representative feature vector of a background cluster that corresponds to the background portion;

a third allocating step of allocating the processing object pixel to the background cluster when the third distance is less than or equal to a third threshold;

a second distance calculating step of respectively calculating, when there are defined clusters and the third distance is greater than the third threshold, distances between the feature vector of the processing object pixel and representative feature vectors of the respective defined clusters, and calculating a second distance that is a minimum distance among the respective calculated distances; and a second allocating step of allocating the processing object pixel to a cluster corresponding to the second distance when the second distance is less than or equal to the second threshold, and newly defining a cluster to which the processing object pixel is to be allocated when there are no defined clusters or when the second distance is greater than the second threshold and allocating the processing object pixel to the newly defined cluster.

24. A computer-readable recording medium on which is recorded a program that causes a computer to execute an image processing method for splitting image data into a plurality of clusters for which representative feature vectors have been defined in advance, said method comprising:

a background identifying step of identifying pixels belonging to a background portion;

a third distance calculating step of calculating a third distance that is the distance between a feature vector of a processing object pixel and a representative feature vector of a background cluster that corresponds to the background portion;

a third allocating step of allocating the processing object pixel to the background cluster when the third distance is less than or equal to a third threshold; and a second allocating step of respectively calculating distances between the feature vector of the processing object pixel and representative feature vectors of the plurality of clusters determined in advance when the third distance is greater than the third threshold and allocating the processing object pixel to a cluster whose distance is closest.

* * * * *